US012285941B2

(12) United States Patent
Takeuchi et al.

(10) Patent No.: US 12,285,941 B2
(45) Date of Patent: Apr. 29, 2025

(54) RECORDING DEVICE, RECORDING SYSTEM, AND CONTROL METHOD FOR RECORDING DEVICE

(71) Applicant: SEIKO EPSON CORPORATION, Tokyo (JP)

(72) Inventors: Moe Takeuchi, Shiojiri (JP); Shun Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 18/190,315

(22) Filed: Mar. 27, 2023

(65) Prior Publication Data

US 2023/0322003 A1 Oct. 12, 2023

(30) Foreign Application Priority Data

Mar. 28, 2022 (JP) ................................ 2022-052126

(51) Int. Cl.

*B41J 11/70* (2006.01)
*B41J 11/00* (2006.01)
*B41J 11/66* (2006.01)
*B41J 15/02* (2006.01)
*B41J 15/04* (2006.01)
(Continued)

(52) U.S. Cl.

CPC ............. *B41J 15/04* (2013.01); *B41J 11/006* (2013.01); *B41J 11/0095* (2013.01); *B41J 11/663* (2013.01); *B41J 11/70* (2013.01); *B41J 11/703* (2013.01); *B41J 15/02* (2013.01); *B41J 29/393* (2013.01); *B41J 11/706* (2013.01); *B41J 15/18* (2013.01)

(58) Field of Classification Search

CPC ...... B41J 15/04; B41J 11/006; B41J 11/0095; B41J 11/663; B41J 11/70; B41J 11/703; B41J 15/02; B41J 29/393; B41J 11/706; B41J 15/18

See application file for complete search history.

(56) References Cited

U.S. PATENT DOCUMENTS

2012/0037680 A1* 2/2012 Ito .......................... B65H 23/34 226/108

FOREIGN PATENT DOCUMENTS

JP 2001121762 A * 5/2001 .............. B41J 11/70
JP 2003095503 A * 4/2003 ............. B65H 29/52
JP 2011177949 A * 9/2011 .............. B41J 29/38

* cited by examiner

*Primary Examiner* — Yaovi M Ameh
(74) *Attorney, Agent, or Firm* — WORKMAN NYDEGGER

(57) ABSTRACT

A recording device includes a roll holding unit, a transport mechanism, a recording unit, a cutting mechanism, and a discharge unit. The recording unit performs recording on a transported medium from the roll. The cutting mechanism cuts the medium, in an intersecting direction intersecting a transport direction. The discharge unit discharges the medium cut by the cutting mechanism. The transport mechanism includes a transport roller pair disposed upstream of the recording unit in the transport path. The control unit determines that the remaining length L2 of the medium is insufficient to perform recording in a state of pinching the medium by the transport roller pair and the remaining length L2 is greater than the predetermined length (affirmative determination in step S14), the control unit cuts, by the cutting mechanism, a remaining medium to a predefined length L3 or less and discharges the remaining medium (steps S17 to S20).

10 Claims, 11 Drawing Sheets

(51) Int. Cl.
*B41J 29/393* (2006.01)
*B41J 15/18* (2006.01)

RECORDING DEVICE, RECORDING SYSTEM, AND CONTROL METHOD FOR RECORDING DEVICE

The present application is based on, and claims priority from JP Application Serial Number 2022-052126, filed Mar. 28, 2022, the disclosure of which is hereby incorporated by reference herein in its entirety.

BACKGROUND

1. Technical Field

The present disclosure relates to a recording device including a recording unit that performs recording on a medium, a recording system, and a control method for the recording device.

2. Related Art

JP-A-2003-095503 discloses a recording device such as a printer for performing printing on a sheet such as paper. The recording device includes a case which surrounds a printing unit including a printing position and has a discharge port for a sheet after printing. In addition, the recording device is provided with a guide means including a guide member in which a transport direction of the sheet from the printing position to the discharge port is substantially a straight line and which guides a back surface of the sheet discharged from the discharge port so as to support the back surface from a tip end side. The guide member has rigidity and includes a receiving surface which is inclined within a range of a predetermined angle with respect to an extension line in a transport direction, and is disposed such that a position at which a tip end side of a medium such as a sheet discharged on the receiving surface is received is lower than the extension line.

Further, the guide means provided in the recording device described in JP-A-2003-095503 is configured to have a downwardly inclined guide surface. In this case, in order to align a loading position of the recording paper cut and discharged after recording, a restricting unit such as a stopper member is provided at a downstream end of the guide means (stacker). That is, in the recording device, the restricting unit such as the stopper member is disposed at a position downstream of a downstream guide member located downstream of the guide member. When the tip end of the medium such as a sheet after recording abuts against the restricting unit, the medium is loaded on the guide means (stacker) in a state of being aligned in the discharge direction.

However, in the recording device described in JP-A-2003-095503, a plurality of rolls are disposed around which a medium such as a sheet is wound. For example, recording is performed on the medium supplied from one of the rolls, and the medium cut to a predetermined length is discharged from the discharge port to the guide means. When all of the media is supplied from the roll, a medium corresponding to a last unrecordable portion of the roll is discharged without recording. When the medium corresponding to the last unrecordable portion of the roll is discharged, in a case where a length of the medium corresponding to the unrecordable portion is greater than the predetermined length, particularly, in a case where the medium has a length greater than the length on a discharge path from the discharge unit such as the discharge roller to the restricting unit, the excessively long portion is forcibly discharged by the discharge unit. Therefore, the medium of the unrecordable portion may be loaded on the guide means in a state in which the upstream end of the medium is curved.

In such a configuration, when the medium corresponding to the last unrecordable portion of the previous roll is discharged, in a case where the length of the unrecordable portion is greater than the length from the upstream end of the guide means to the position of the restricting unit, the medium cannot be correctly loaded. Even if the medium can be loaded, when the medium is curved and lifted, the medium becomes an obstacle to the discharge of the medium from the next roll, which may cause jamming.

SUMMARY

A recording device for solving the problem includes a roll holding unit configured to hold a roll including a long medium wound around a core body, a transport mechanism configured to transport the medium supplied from the roll in a transport direction along a transport path, a recording unit configured to perform recording on the transported medium in the transport path, a cutting mechanism configured to cut the medium, on which recording is performed by the recording unit, in an intersecting direction intersecting the transport direction, a discharge unit configured to discharge the medium cut by the cutting mechanism, and a control unit, wherein the transport mechanism includes a transport roller pair disposed upstream of the recording unit in the transport path, and when the control unit, upon performing recording on the medium, cutting the medium to a predetermined length, and discharging the medium, determines that the remaining length of the medium is insufficient to perform recording in a state of pinching the medium by the transport roller pair and the remaining length is greater than the predetermined length, the control unit cuts, by the cutting mechanism, a remaining medium to a predefined length or less and discharges the remaining medium.

A recording system for solving the problem is a recording system including a recording device and a medium loading device, wherein the recording device includes a roll holding unit configured to hold a roll including a long medium wound around a core body, a transport mechanism configured to transport the medium supplied from the roll in a transport direction along a transport path, a recording unit configured to perform recording on the transported medium in the transport path, a cutting mechanism configured to cut the medium, on which recording is performed by the recording unit, in an intersecting direction intersecting the transport direction, a discharge unit configured to discharge the medium cut by the cutting mechanism, and a control unit, the medium loading device includes a placement unit configured to place the medium discharged from the discharge unit of the recording device, and a restricting unit configured to restrict the medium placed at the placement unit from moving downstream in a discharge direction, the transport mechanism includes a transport roller pair disposed upstream of the recording unit in the transport path, and when the control unit, upon performing recording on the medium, cutting the medium to a predetermined length, and discharging the medium, determines that the remaining length of the medium is insufficient to perform recording in a state of pinching the medium by the transport roller pair and the remaining length is greater than the placeable length at the placement unit, the control unit cuts, by the cutting mechanism, a remaining medium to the placeable length at the placement unit and discharges the remaining medium.

A control method for a recording device for solving the problem is a control method for a recording device including a roll holding unit configured to hold a roll including a long medium wound around a core body, a transport mechanism configured to transport the medium supplied from the roll in a transport direction along a transport path, a recording unit configured to perform recording on the transported medium in the transport path, a cutting mechanism configured to cut the medium, on which recording is performed by the recording unit, in an intersecting direction intersecting the transport direction, a discharge unit configured to discharge the medium cut by the cutting mechanism, and a control unit, wherein the transport mechanism includes a transport roller pair disposed upstream of the recording unit in the transport path, and the method includes, when determining, upon performing recording on the medium, cutting the medium to a predetermined length, and discharging the medium, that the remaining length of the medium is insufficient to perform recording in a state of pinching the medium by the transport roller pair and the remaining length is greater than the predetermined length, cutting, by the cutting mechanism, the remaining medium to a predefined length and discharging the remaining medium.

DESCRIPTION OF EXEMPLARY EMBODIMENTS

Hereinafter, an exemplary embodiment of a recording device and a recording system will be described with reference to the drawings.

A recording device 11 according to the exemplary embodiment is an ink jet type printer which records a character, an image, etc. on a medium 23 by discharging liquid such as ink to the medium 23 such as paper. The recording device 11 rotatably holds a roll 25 in which a medium is wound around a core body 24, and performs recording on the medium 23 fed out from the roll 25.

Figure 1:
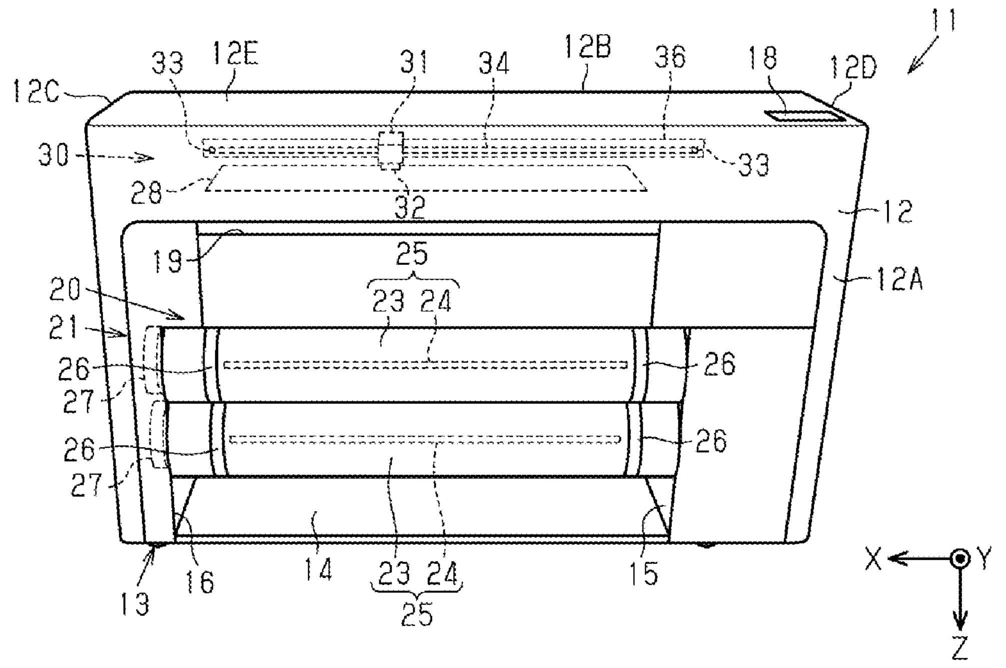
FIG. 1 is a front perspective view of a recording device according to an exemplary embodiment.
Figure 5:
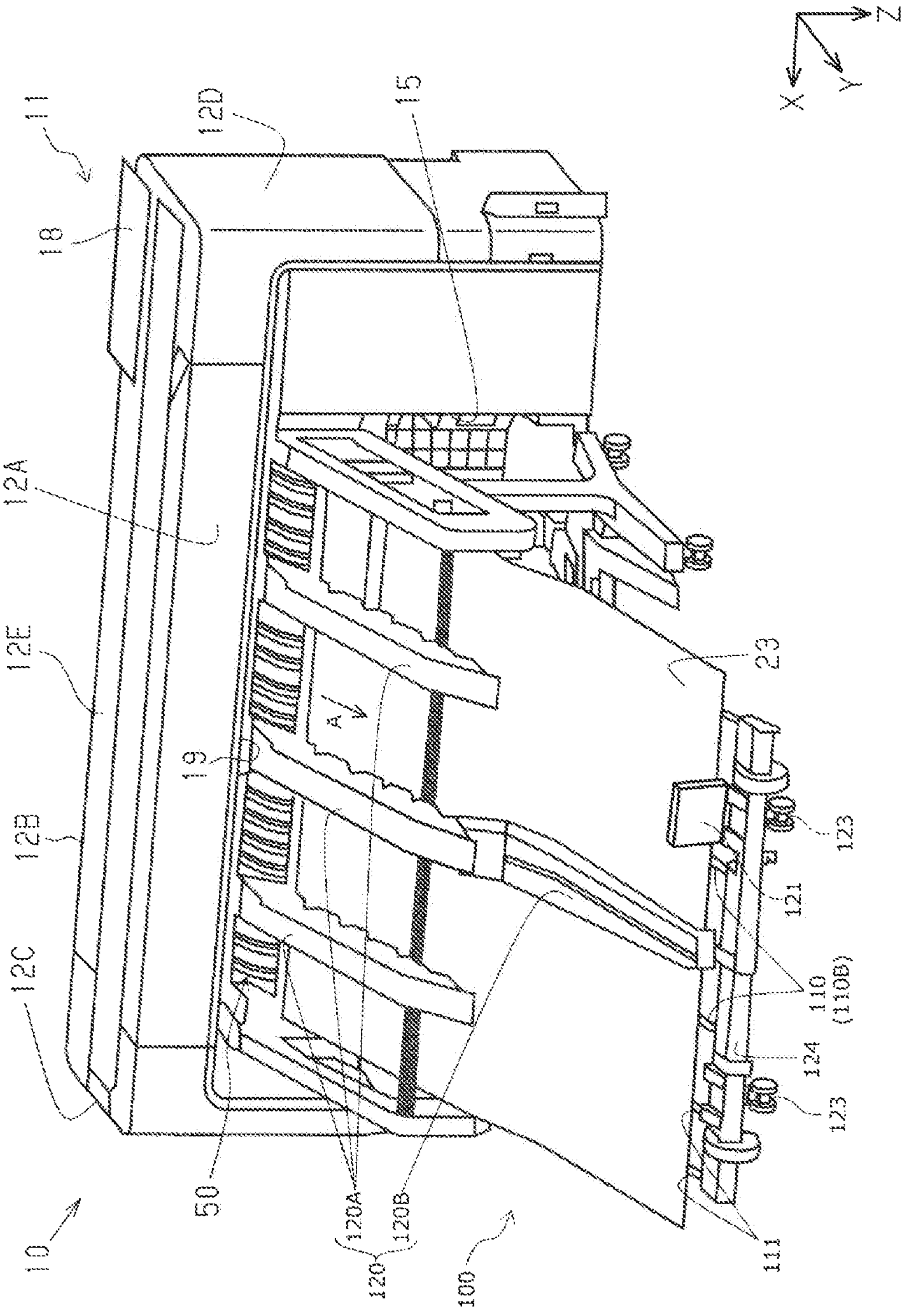
FIG. 5 is a perspective view illustrating a recording system.
Figure 7:
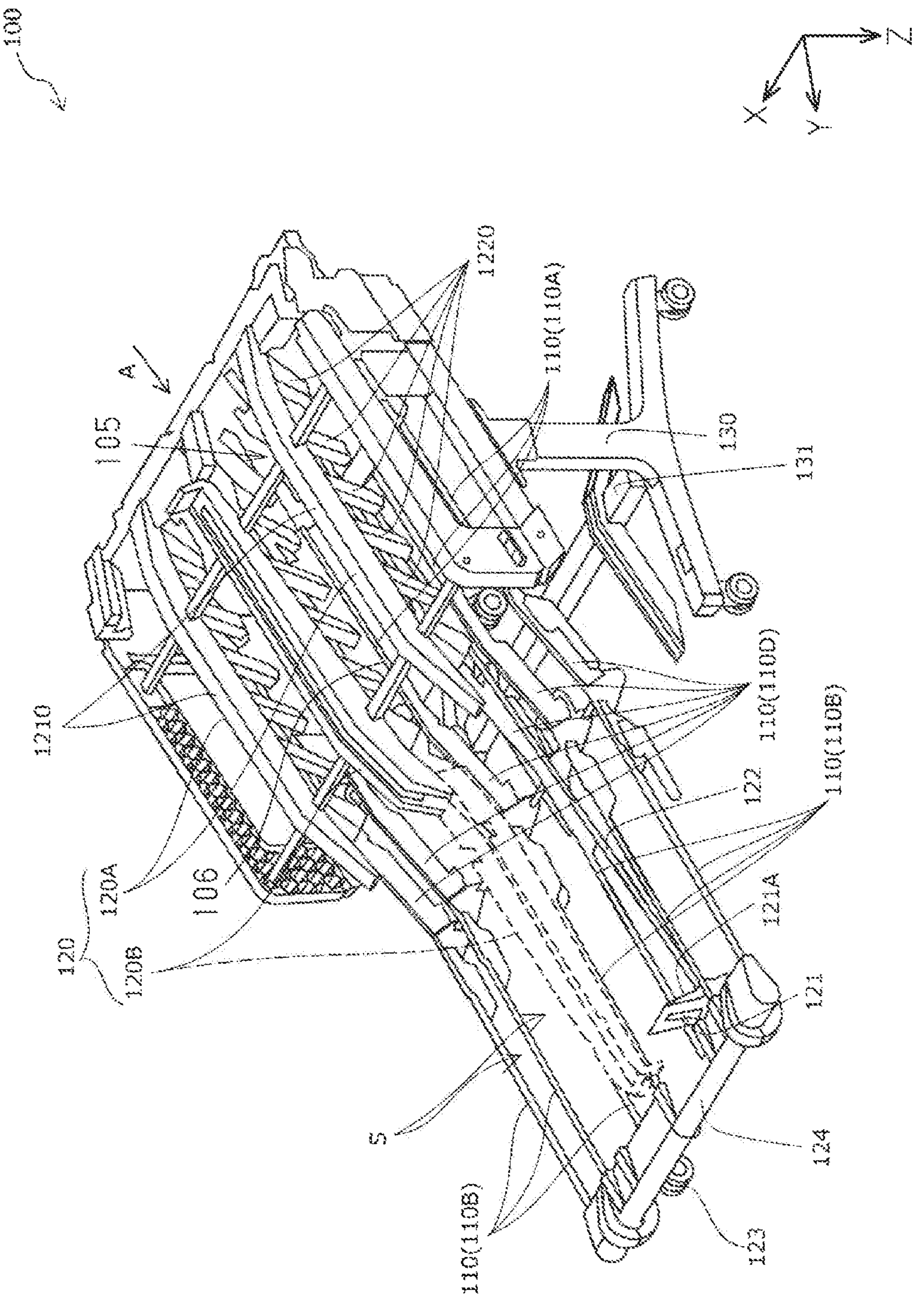
FIG. 7 is a perspective view illustrating the medium loading device.

The recording device 11 illustrated in FIG. 1 is used in combination with a medium loading device 100 illustrated in FIG. 7, etc. to constitute a recording system 10 illustrated in FIG. 5. That is, the recording system 10 illustrated in FIG. 5 includes the recording device 11 and the medium loading device 100.

The medium loading device 100 according to the exemplary embodiment illustrated in FIG. 5, etc. is coupled to a side of a discharge unit 50 with respect to the recording device 11. The medium loading device 100 is configured to load the medium 23, on which recording is performed, that is cut to a predetermined length L1 and discharged from the discharge unit 50 of the recording device 11. Two rolls 25 can be mounted to the recording device 11, and the recording device 11 includes an automatic feeding mechanism (not illustrated) that automatically feeds the medium 23 from one of the rolls 25 when the medium 23 of another roll 25 runs out. Therefore, the recording device 11 can perform recording for two rolls in an unmanned manner. The medium loading device 100 can load a large number of media 23 corresponding to about two rolls 25.

Hereinafter, configurations of the recording device 11 and the medium loading device 100 will be described in order.

Configuration of Recording Device 11

Hereinafter, a Z-axis is defined as a virtual axis parallel to the vertical direction Z on the assumption that the recording device 11 is placed at a horizontal plane. Two virtual axes parallel to two directions along a virtual plane orthogonal to the Z-axis are defined as an X-axis and a Y-axis, respectively. A direction parallel to the X-axis is referred to as an X direction, and a direction parallel to the Y-axis is referred to as a Y direction. A transport direction D (refer to FIG. 2) in which the medium 23 is transported varies according to the position of the medium 23 on the transport path. Since the X direction is equal to an intersecting direction or a width direction intersecting the transport direction D of the medium 23, the X direction is also referred to as an intersecting direction X or a width direction X. In addition, since the width direction X is equal to a scanning direction which is the movement direction of a carriage 31, the width direction X may also be referred to as a scanning direction X. Further, since the Y direction is a transport direction D of the medium 23 at a recording position when a recording head 32 mounted on the carriage 31 performs recording on the medium 23, the Y direction is referred to as a transport direction Y. The Z direction includes a downward direction +Z in the gravity direction and an upward direction −Z opposite to the downward direction +Z. In addition, the X direction (scanning direction X) includes a +X direction which is a forward movement direction when the carriage 31 reciprocates and a −X direction which is a backward movement direction.

As illustrated in FIG. 1, the recording device 11 includes a housing 12 and a leg portion 13 that supports the housing 12. The housing 12 has a substantially rectangular parallelepiped shape. The housing 12 includes a front wall 12A, a rear wall 12B, a first sidewall 12C, a second sidewall 12D, an upper wall 12E, and a base frame 14 supported by the leg portion 13. The leg portion 13 includes a caster 17 (see FIG. 2).

As illustrated in FIG. 1, the housing 12 includes an accommodating portion 15 that accommodates two cylindrical rolls 25. The accommodating portion 15 has an opening 16 in a lower portion of the front wall 12A side of the housing 12, and the rolls 25 can be attached to and detached from the accommodating portion 15 from the front side through the opening 16.

The recording device 11 includes a roll holding unit 26 and a transport mechanism 20. The roll holding unit 26 holds the roll 25 on which a long medium 23 is wound around a core body 24. The transport mechanism 20 transports the medium 23 supplied from the roll 25 in the transport direction D along a transport path 29 (see FIG. 2).

The recording device 11 includes a recording unit 30, a cutting mechanism 60, a discharge unit 50, and a control unit 70. The recording unit 30 performs recording on the transported medium 23 in the transport path 29. The cutting mechanism 60 cuts the medium 23 on which recording is performed by the recording unit 30 in the intersecting direction X intersecting the transport direction D. The discharge unit 50 discharges the medium 23 cut by the cutting mechanism 60. The control unit 70 controls the transport mechanism 20, the recording unit 30, the cutting mechanism 60, and the discharge unit 50.

In the recording device 11, a plurality of roll holding units 26 are disposed, and continuous recording can be performed on the medium 23 held by the plurality of roll holding units 26. In a case where the roll 25 is set in each of the plurality of roll holding units 26, when the medium 23 is supplied from one roll 25 to a rear end of the medium 23 and reaches the end, the transport of the preset starting end of the other roll 25 is started. In this manner, switching of the roll 25 of the supply source of the medium 23 on which the recording unit 30 performs recording is automatically performed.

Transport Mechanism 20

As illustrated in FIG. 1, the recording device 11 includes a feeding unit 21 that supplies the medium 23 from the roll 25 and a transport mechanism 20 that transports the medium 23 supplied from the roll 25. A pair of the roll holding units 26 rotatably holds the roll 25 with an axis extending in the width direction X as a rotation center. The roll 25 is configured to be removable from the housing 12 through the opening 16. The roll 25 held by the roll holding unit 26 is rotated by a driving force of a feeding motor 27 which is a driving source, and the medium 23 is supplied from the roll 25.

As illustrated in FIG. 1, the recording device 11 includes the accommodating portion 15 capable of accommodating the two rolls 25 in a front portion of the housing 12. The rolls 25 are formed by winding the medium 23 around the core body 24. The two rolls 25 are accommodated in the accommodating portion 15 in a state of being arranged in the vertical direction Z.

The medium 23 supplied from the roll 25 is transported by the transport mechanism 20 to a recording position at which the recording unit 30 can perform recording.

Figure 2:
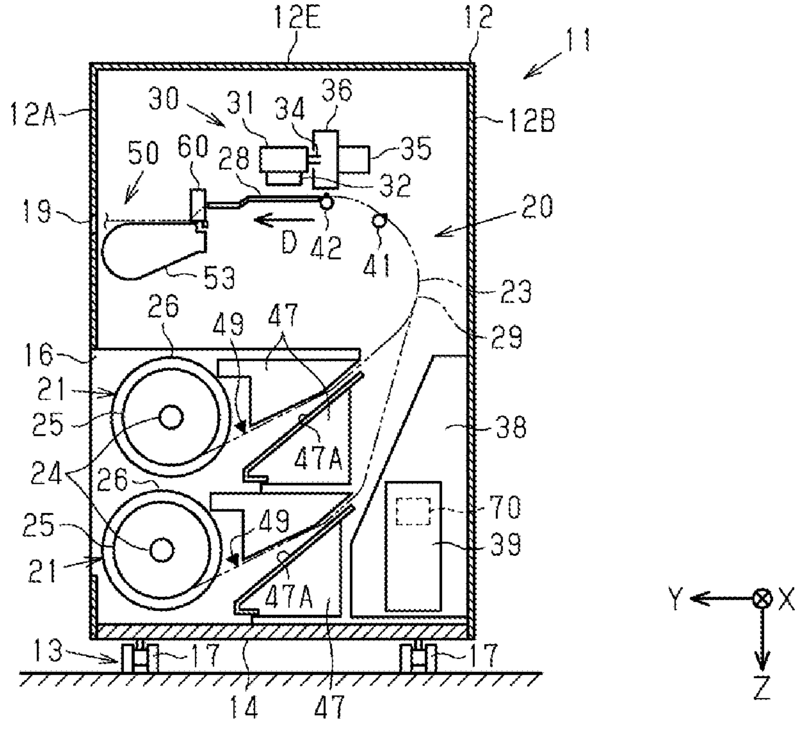
FIG. 2 is a schematic side sectional view illustrating an internal structure of the recording device.

As illustrated in FIGS. 1 and 2, the recording device 11 includes the recording unit 30 at a position above the accommodating portion 15 in the housing 12. The recording unit 30 includes the recording head 32 that performs recording on the medium 23 transported in the transport direction Y, and the carriage 31 on which the recording head 32 is mounted and which moves (scans) in the scanning direction X intersecting the transport direction Y.

The carriage 31 is guided along a guide rail 36. The carriage 31 is fixed to a part of an endless timing belt 34 wound around a pair of pulleys 33 located at both end portions of the guide rail 36. When a carriage motor 35 is driven and the timing belt 34 is rotated, the carriage 31 reciprocates in the width direction X along the guide rail 36, and an image, etc. is recorded on the medium 23 by the recording head 32 discharging ink during the movement.

As illustrated in FIG. 1, the recording device 11 includes an operation panel 18 at an upper portion of the housing 12. The operation panel 18 includes an operation mechanism that can be operated by a user when giving an instruction to the recording device 11, and a display function of displaying a menu, etc.

As illustrated in FIG. 2, the transport mechanism 20 includes a transport path forming unit 47. The transport path forming unit 47 is provided corresponding to each of the pair of rolls 25. The transport path forming unit 47 includes a guide portion 47A that is located behind each of the two rolls 25 accommodated in the accommodating portion 15 and guides the medium 23 fed from the roll 25 to the rear of the recording unit 30. The medium 23 fed from the roll 25 passes through the guide portion 47A and is sent to the transport roller pair 41, 42, etc. along the transport path 29 indicated by a two dot chain line in FIG. 2.

As illustrated in FIG. 2, the transport mechanism 20 includes a plurality of transport roller pairs 41, 42, etc. that pinch and transport the fed medium 23. The transport mechanism 20 transports the medium 23 supplied from the roll 25 to a recording position of the recording unit 30 along the predetermined transport path 29.

The discharge unit 50 is provided in the housing 12, and the discharge unit 50 discharges the medium 23 after recording on which recording is performed by the recording unit 30 from the discharge port 19. The cutting mechanism 60 for cutting the medium 23 after recording is provided in the housing 12. The medium 23 after recording is cut to a predetermined length by the cutting mechanism 60 and is discharged from the discharge port 19 by the discharge unit 50.

As illustrated in FIG. 2, a control box 39 is disposed in an accommodating chamber 38 provided inside a rear portion of the housing 12. In the control box 39, the control unit 70 that controls various control targets such as the transport mechanism 20 and the recording unit 30, a power supply circuit (not illustrated) that supplies necessary power to the recording device 11, etc. are accommodated.

When recording is performed, the medium 23 is fed from only one of the two rolls 25. When one of the two rolls 25 runs out of the medium 23, the medium 23 is pulled out from the other roll 25 prepared in advance, and thus it is possible to automatically switch the roll 25 and restart recording.

Internal Structure of Recording Device 11

Next, an internal structure of the recording device 11 will be described with reference to FIG. 3.

Figure 3:
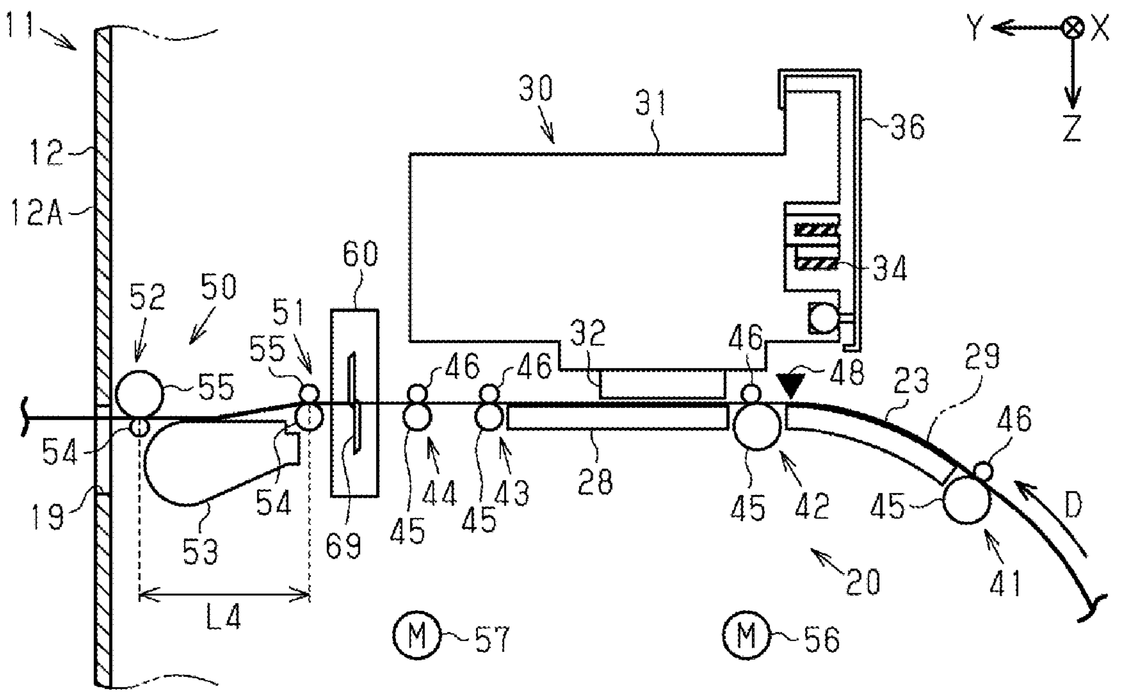
FIG. 3 is a schematic side sectional view illustrating an internal structure of a part of the recording device.

As illustrated in FIG. 3, the transport mechanism 20 includes a first transport roller pair 41, a second transport roller pair 42 as an example of a transport roller pair, a third transport roller pair 43, and a fourth transport roller pair 44 along the transport direction D. The first transport roller pair 41 and the second transport roller pair 42 are disposed at positions on the upstream of the recording head 32 in the transport direction D. The third transport roller pair 43 and the fourth transport roller pair 44 are disposed downstream of the recording head 32 and upstream of the cutting mechanism 60 in the transport direction Y. The fourth transport roller pair 44 holds the medium 23 to be cut by the cutting mechanism 60 at an upstream position.

The first to fourth transport roller pairs 41 to 44 each include a driving roller 45 that can be rotated by a driving force of the transport motor 56, and a driven roller 46 that can be rotated by rotation of the driving roller 45. The first to fourth transport roller pairs 41 to 44 transport the medium 23 by rotating in a state in which the medium 23 is sandwiched between the driving roller 45 and the driven roller 46.

The recording unit 30 includes the recording head 32 that discharges liquid such as ink toward the medium 23, and the carriage 31 on which the recording head 32 is mounted. The carriage 31 is supported by the guide rail 36. The carriage 31 is fixed to a part of the timing belt 34, and is movable in the scanning direction X when the timing belt 34 is rotated forward and backward by the carriage motor 35 illustrated in FIG. 2. As the carriage 31 moves along the guide rail 36, the recording head 32 can discharge ink onto the medium 23 over the entire area of the medium 23 in the width direction X.

In addition, a support base 28 having a support surface capable of supporting the medium 23 is disposed at a position facing the lower side of the movement path of the recording head 32 in the vertical direction Z. The plurality of transport roller pairs 41, 42, etc. transport the medium 23 in the transport path 29 passing on the support base 28. The recording unit 30 performs recording on a portion of the medium 23 supported by the support base 28. Ink is supplied to the recording head 32 from an ink supply source such as an ink cartridge or an ink tank through a tube, etc. (not illustrated).

As illustrated in FIG. 3, the discharge unit 50 discharges the medium 23 cut to a predetermined length. The discharge unit 50 includes a discharge roller pair 51, a discharge roller pair 52 located downstream of the discharge roller pair 51 in the transport direction D, and the discharge port 19 located downstream of the discharge roller pair 52 in the transport direction D. Each of the discharge roller pairs 51, 52 includes a driving roller 54 that can be rotated by a driving force of a discharge motor 57 and a driven roller 55 that can be rotated by the rotation of the driving roller 54. The discharge roller pair 51 and the discharge roller pair 52 transport the medium 23 by rotating in a state in which the medium 23 is sandwiched between the driving roller 54 and the driven roller 55. In addition, the discharge unit 50 includes a discharge support base 53 that supports the medium 23 on the downstream in the transport direction D from the position where the medium 23 is cut.

As illustrated in FIG. 3, the cutting mechanism 60 is disposed between the fourth transport roller pair 44 and the first discharge roller pair 51 in the transport direction D. The cutting mechanism 60 includes a cutter blade 69 capable of cutting the medium 23. The medium 23 cut by the cutting mechanism 60 is transported downstream in the transport direction D by the first discharge roller pair 51 and the second discharge roller pair 52, and is discharged to the outside of the housing 12 from the discharge port 19.

Configuration of Cutting Mechanism 60

Next, a detailed configuration of the cutting mechanism 60 will be described with reference to FIG. 4.

Figure 4:
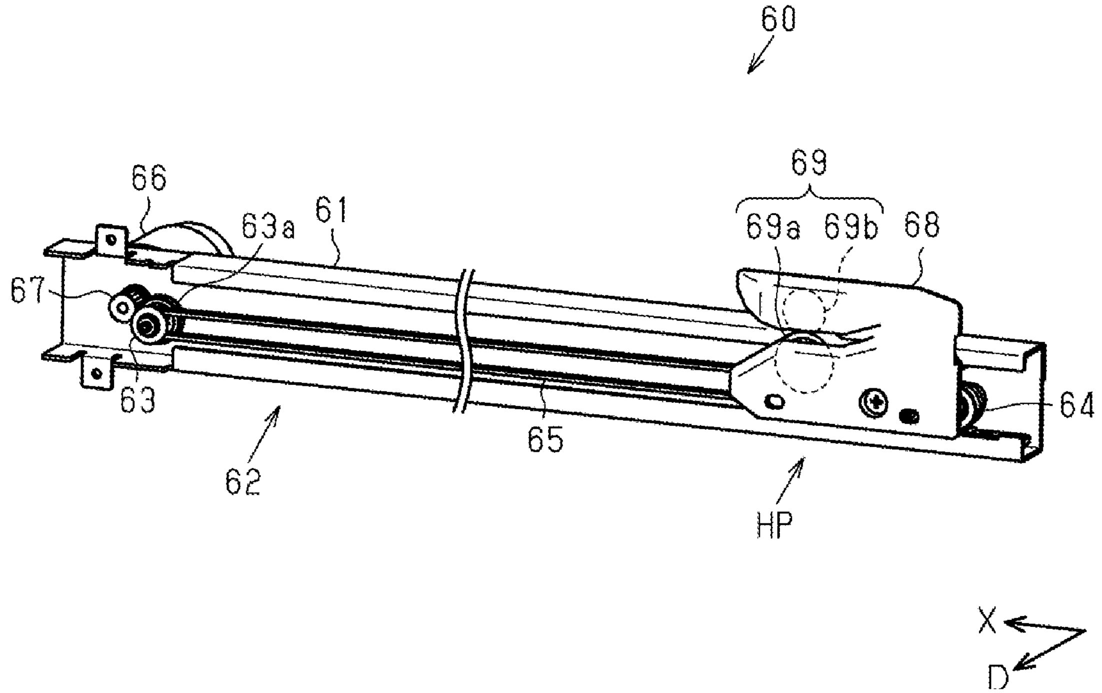
FIG. 4 is a perspective view illustrating a cutting mechanism.

As illustrated in FIG. 4, the cutting mechanism 60 has a rail 61 provided extending along the width direction X, and a cutter carriage 68 attached to be able to reciprocate in the width direction X along the rail 61. A cutter blade 69 is held by the cutter carriage 68. The cutter carriage 68 is configured to be able to reciprocate in the width direction X of the medium 23 as a movement direction. The cutter blade 69 cuts the medium 23 when the cutter carriage 68 moves in one direction of the width direction X. In FIG. 4, when the cutter carriage 68 moves from right to left, the medium 23 is cut. The cutter blade 69 includes a driving blade 69*a* that is driven to rotate in accordance with the movement of the cutter carriage 68 and a driven blade 69*b* that is driven to rotate in accordance with the rotation of the driving blade 69*a*.

As illustrated in FIG. 4, the rail 61 is provided with a power transmission mechanism 62 that transmits power for reciprocating the cutter carriage 68 in the width direction X. The power transmission mechanism 62 includes pulleys 63, 64 provided at both ends of the rail 61 in the width direction X, and an annular belt 65 wound around the pulleys 63, 64. The cutter carriage 68 is fixed to a part of the belt 65.

In FIG. 4, an electric motor 66 is provided at one end of the rail 61. A pinion 67 is attached to an output shaft of the electric motor 66 and meshes with a toothed wheel 63*a* provided coaxially with the pulley 63. When the electric motor 66 is driven, the driving force is transmitted to the cutter carriage 68 via the power transmission mechanism 62 including the belt 65.

The cutter carriage 68 stands by at a standby position HP illustrated in FIG. 4. The medium 23 stops at a position where the cut position of the medium 23 coincides with the cutting position of the cutting mechanism 60. In this state, when the electric motor 66 is driven to rotate forward, the cutter carriage 68 holding the cutter blade 69 moves forward in the width direction X along the rail 61 from the standby position illustrated in FIG. 4. The medium 23 is cut at the cutting position by the cutter blade 69. Thereafter, when the electric motor 66 is driven to rotate in the reverse direction, the cutter carriage 68 returns to the standby position HP by moving back in the width direction X.

Configuration of Medium Loading Device 100

Next, a configuration of the medium loading device 100 will be described.

Figure 6:
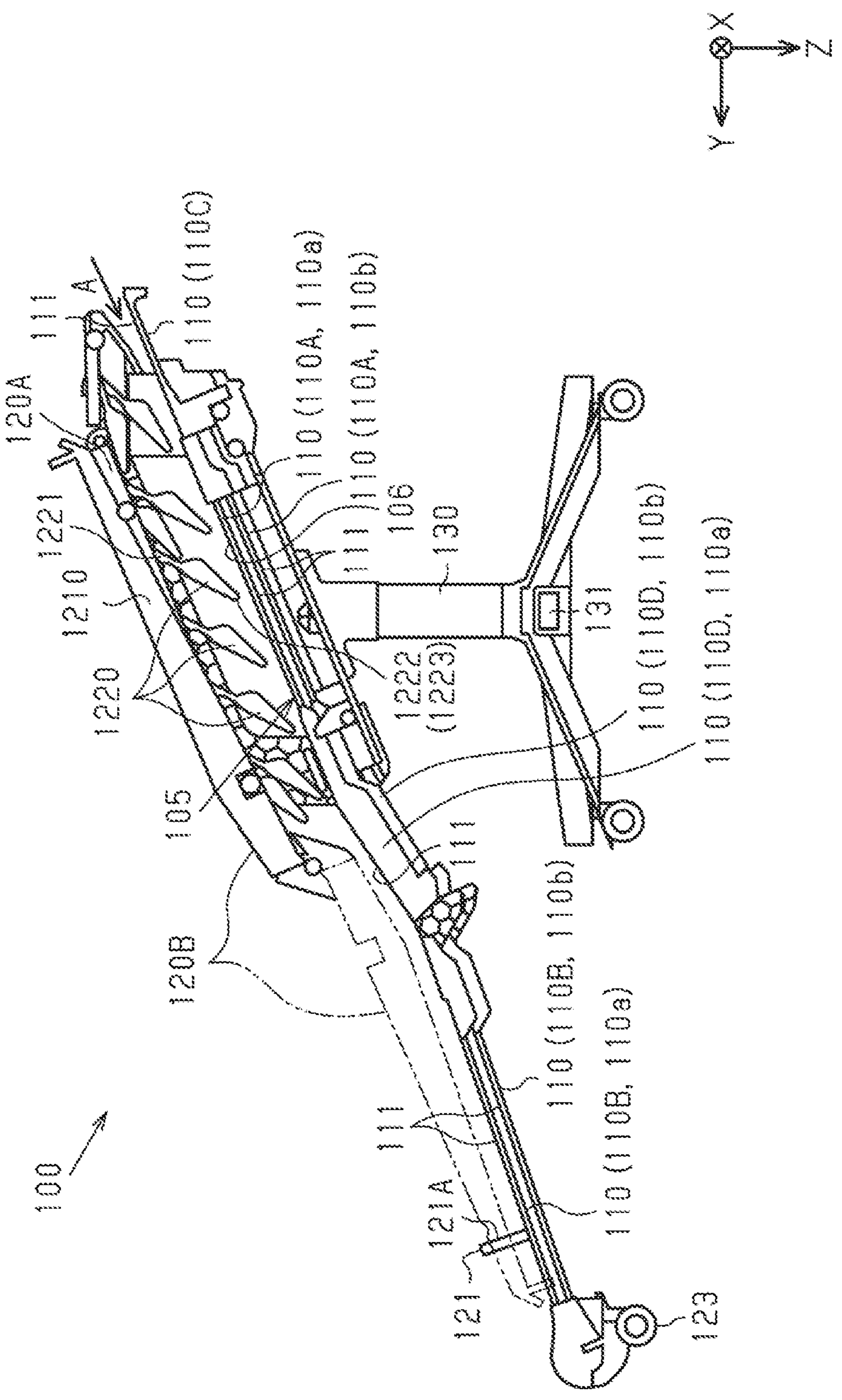
FIG. 6 is a side view illustrating a medium loading device.

As illustrated in FIGS. 5 and 6, the medium loading device 100 includes a placement unit 105 at which the medium 23 discharged from the discharge unit 50 of the recording device 11 can be placed, and a restricting unit 121 that restricts the medium 23 placed at the placement unit 105 from moving downstream in the discharge direction A. The placement unit 105 of the medium loading device 100 is lowered and inclined so that a height on the downstream in the discharge direction A of the medium 23 is lower than a height on the upstream. The restricting unit 121 is a stopper that comes into contact with the downstream end in the discharge direction A of the medium 23 loaded on the medium loading device 100 and determines the loading position in the discharge direction A of the medium 23.

Therefore, in the recording system 10, when the control unit 70 determines that the remaining length L2 (see FIG. 11) of the medium 23 is insufficient for recording and discharging and the remaining length L2 is greater than the placeable length at the placement unit 105 upon performing recording on the medium 23, cutting the medium 23 to the predetermined length L1, and discharging the medium 23, the control unit 70 cuts, by the cutting mechanism 60, a remaining medium 23*r* to a placeable length at the placement unit 105 and discharges the remaining medium 23*r*. The placeable length of the medium 23 at the placement unit 105 varies in accordance with the arrangement position of the restricting unit 121, the position of which is adjusted in the discharge direction A in accordance with the predetermined length L1 by which the medium 23 is cut after recording.

For example, "the remaining length L2 of the medium 23 is insufficient for recording and discharging" means that, when recording is performed on the medium 23 by the recording head 32, a length that allows recording in a state of pinching the medium 23 by the second transport roller pair 42 upstream of the recording unit 30 is insufficient. To be specific, when a rear end 23E of the medium 23 is located downstream of the pinch position of the second transport roller pair 42 in the transport direction D, the rear end 23E of the medium 23 is not fixed by the second transport roller pair 42, and thus the posture of the medium 23 becomes unstable, and the recording quality may deteriorate. By performing recording in a state of pinching the medium 23 by the second transport roller pair 42, it is possible to stabilize the posture of the medium 23 and to prevent a decrease in recording quality.

Figure 8:
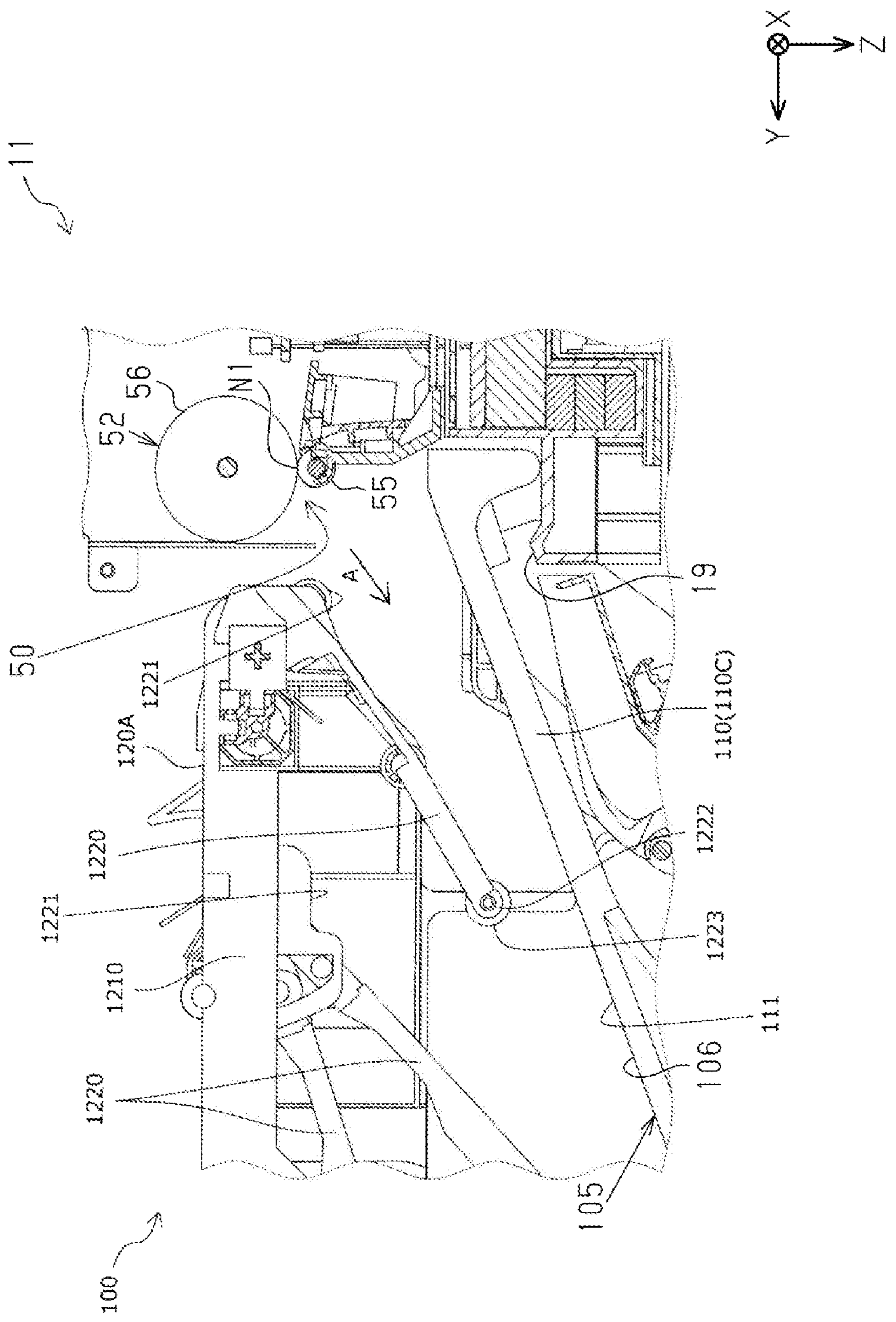
FIG. 8 is a side cross-sectional view illustrating a portion where a discharge unit of the recording device and an upstream portion of the medium loading device are coupled to each other.

Hereinafter, the medium loading device 100 will be described in detail with reference to FIGS. 5 to 8. As illustrated in FIGS. 5 and 8, the medium loading device 100 can be coupled to the recording device 11, and has a configuration in which a plurality of media 23 discharged in a discharge direction A from the discharge unit 50 of the recording device 11 can be loaded on the placement unit 105.

As illustrated in FIGS. 6 and 7, the medium loading device 100 supports the medium 23 discharged from the discharge unit 50 on a support surface 111 from the lower direction +Z side in the gravity direction by a plurality of support units 110 provided in the width direction X intersecting the discharge direction A of the medium 23. The plurality of support units 110 constitute the placement unit 105 on which the medium 23 is loaded. A placement surface 106 on which the medium 23 is loaded is formed by a plurality of the support surfaces 111.

In the medium loading device 100, the plurality of support units 110 are disposed at a predetermined pitch such that adjacent support units 110 are arranged at intervals in the width direction X. As illustrated in FIGS. 6 and 7, in the medium loading device 100 of the present exemplary embodiment, a space S is provided between a first support unit 110*a* and a second support unit 110*b* in the X direction, and the space S in the X direction is wider than the support surface 111 in the X direction. That is, in the medium loading device 100 of the present exemplary embodiment, the contact area between the support surface 111 and the medium 23 is small. Therefore, it is possible to reduce the frictional force between the support surface 111 and the medium 23, and it is possible to particularly suitably load various types of media 23 without using power, etc. Here, as illustrated in FIGS. 3, 4, etc., the support unit 110 extends in the discharge direction A and is inclined to be lowered in the gravity direction from the upstream to the downstream in the discharge direction A. In addition, as the support unit 110, the first support unit 110*a* and the second support unit 110*b* disposed at a position lower than the first support unit 110*a* in the Z direction when viewed from the X direction as illustrated in FIG. 6 are alternately provided in the X direction.

In this manner, in the medium loading device 100, the support unit 110 extends in the discharge direction A and is inclined to be lowered in the gravity direction from the upstream to the downstream in the discharge direction A. Therefore, the medium 23 can be moved by using gravity, and the medium 23 can be efficiently moved without using power, etc. In addition, since the first support unit 110*a* and the second support unit 110*b* are alternately provided in the widthwise direction as the support unit 110, it is possible to form the moving medium 23 in a wavy shape when viewed from the discharge direction A, it is easy to suppress curling in which the tip end in the discharge direction A hangs down, and it is possible to suppress being caught by the support surface 111 or the placed medium 23 which is already placed at the support surface 111. Therefore, the medium loading device 100 can suitably load various types of media 23 without using power, etc.

As illustrated in FIGS. 3, 4, and 6, the support unit 110 includes an upstream portion 110A located on the upstream in the discharge direction A, a downstream portion 110B located on the downstream in the discharge direction A with respect to the upstream portion 110A, and a coupling portion 110D coupling the upstream portion 110A and the downstream portion 110B. As illustrated in FIG. 6, the coupling portion 110D is steeper than the other region of the upstream portion 110A and the downstream portion 110B when viewed from the X direction.

For example, even when the medium 23 having a large size such as a B0 size is used, the medium 23 can be moved in the discharge direction A by using gravity in the coupling portion 110D having a steep inclination. Therefore, the medium loading device 100 can particularly preferably load various types of media 23 without using power, etc.

As illustrated in FIGS. 6 and 8, in the present exemplary embodiment, a bridging member 110C that couples the lower side of the discharge unit 50 of the recording device 11 and the upstream portion 110A is provided further upstream in the discharge direction A than the upstream portion 110A.

As illustrated in FIGS. 6 and 7, the restricting unit 121 restricts the medium 23 supported by the support unit 110 from moving downstream in the discharge direction A by a restriction surface 121A extending from the support surface 111 side to a pressing portion 120 side. As illustrated in FIG. 7, the medium loading device 100 includes a restricting unit holding shaft 122 that extends in the discharge direction A and holds the restricting unit 121 movably in the discharge direction A.

In this manner, in the medium loading device 100, the restricting unit 121 can be disposed at any position from the downstream portion 110B side to the upstream portion 110A side along the restricting unit holding shaft 122. Since the medium loading device 100 includes the restricting unit 121, it is possible to continuously place the medium 23 at the support unit 110 with the placement position in the discharge direction A being aligned.

As illustrated in FIG. 7, in the medium loading device 100, the restricting unit 121 is provided on the −X direction side in the width direction X. This is because the recording device 11 used together with the medium loading device 100 is provided with the home position of the carriage 31 on the −X direction side and is used with the medium 23 being shifted to the −X direction side. The arrangement position and the number of the restricting units 121 in the X direction may be appropriately changed according to the aspect of the recording device 11 used together with the medium loading device 100. For example, the restricting unit 121 may be provided at a central position in the width direction X of the medium loading device 100. Further, the restricting unit 121 may be configured to be movable in the width direction X.

As illustrated in FIGS. 5 to 7, the medium loading device 100 includes the pressing portion 120 that presses the medium 23 supported by the support unit 110 from the upper side in the Z direction. As illustrated in FIG. 5, the pressing portion 120 is disposed at a position facing the support surface 111 of the first support unit 110*a*. With such a configuration, the medium loading device 100 of the present exemplary embodiment can sandwich the medium 23 in the up-down direction between the pressing portion 120 and the support surface 111 of the first support unit 110*a*, and can suitably prevent the medium 23 from curling when viewed in the X direction and the tip end portion of the medium 23 from being caught by the support surface 111, the placed medium, etc.

In addition, as illustrated in FIG. 7, the pressing portion 120 includes an upstream pressing portion 120A disposed to face an upstream portion of the support unit 110, a downstream pressing portion 120B disposed to face a downstream portion of the support unit 110, and a rotation fulcrum coupling the upstream pressing portion 120A and the downstream pressing portion 120B. The downstream pressing portion 120B is rotatable upward with respect to the rotation fulcrum, that is, in a direction away from the support unit 110 (the first support unit 110*a* of the downstream portion 110B). Since the medium loading device 100 of the present exemplary embodiment includes the upstream pressing portion 120A and the downstream pressing portion 120B as the pressing portion 120, it is possible to use only the upstream pressing portion 120A when using a short medium 23 and to use both the upstream pressing portion 120A and the downstream pressing portion 120B when using a long medium 23. Therefore, in the medium loading device 100 of the present exemplary embodiment, not only when the short medium 23 is used but also when the long medium 23 is used, the medium 23 can be effectively sandwiched from above and below by the pressing portion 120 and the support surface 111.

Here, as illustrated in FIGS. 6 and 7, the upstream pressing portion 120A includes a base portion 1210 extending in the discharge direction A and a plurality of arm portions 1220 provided at positions facing the support surface 111 in the base portion 1210. As illustrated in FIG. 6, a base end 1221 of the arm portion 1220 is attached to the base portion 1210 rotatably around the X direction as a rotation axis. In addition, the arm portion 1220 is provided with a rotating member 1223 which is rotatable around the X direction as a rotation axis at a tip end 1222 opposite to the base end 1221.

In a state where the downstream pressing portion 120B is disposed at a position indicated by a two dot chain line in FIG. 6, a plurality of rotating bodies (not illustrated), which extend in the discharge direction A and are rotatable about the X direction as a rotation axis, are provided at a position facing the support surface 111. As illustrated in FIG. 6, the interval between the downstream pressing portion 120B and the support surface 111 is smaller than the interval between the base portion 1210 and the support surface 111.

This is because the recording device 11 illustrated in FIG. 1, which can be used together with the medium loading device 100, can set two rolls of the roll 25. When the roll 25 is cut short, the number of media 23 increases, and when the roll 25 is cut long, the number of media 23 decreases. Therefore, when the short medium 23 is used, the number of loaded media 23 is greater than that when the long medium 23 is used. Therefore, in the placement unit 105 of the medium loading device 100, the interval of the region in which the short medium 23 is loaded is wider than the interval of the region in which the long medium 23 is loaded. As a result, the size of the medium loading device 100 is reduced by securing a loading space corresponding to the number of loadable media 23 in a case where the short medium 23 is used and narrowing the loading space corresponding to the number of loadable media 23 in a case where the long medium 23 is used.

As illustrated in FIG. 8, the upstream pressing portion 120A includes the base portion 1210 and the plurality of arm portions 1220. The base end 1221 of the arm portion 1220 is rotatable about the width direction X as a rotation axis with respect to the base portion 1210, and the rotating member 1223 is provided at the tip end 1222 of the arm portion 1220. Accordingly, it is possible to press the medium 23 upstream in the discharge direction A, and to suitably move the medium 23. In addition, since the rotating member 1223 is provided, the movement of the medium 23 becomes smooth.

As illustrated in FIGS. 5 and 6, the medium loading device 100 includes a caster 123 on the lower direction +Z side in the gravity direction in a downstream end portion 124 in the discharge direction A. Therefore, the medium loading device 100 can be stably installed by installing the caster 123 on the installation surface. In addition, the medium loading device 100 includes two leg portions 130 provided at both ends in the X direction and a leg portion coupling member 131 coupled to the two leg portions 130.

In this manner, in the medium loading device 100, the medium 23 having a length equal to or less than the length on the transport path from the discharge unit 50 of the recording device 11 to the restricting unit 121 is loaded on the placement unit 105. However, when the medium 23 having a length exceeding the length on the transport path from the discharge unit 50 of the recording device 11 to the restricting unit 121 is discharged to the placement unit 105, jamming easily occurs.

Electrical Configuration of Recording Device 11

Figure 10:
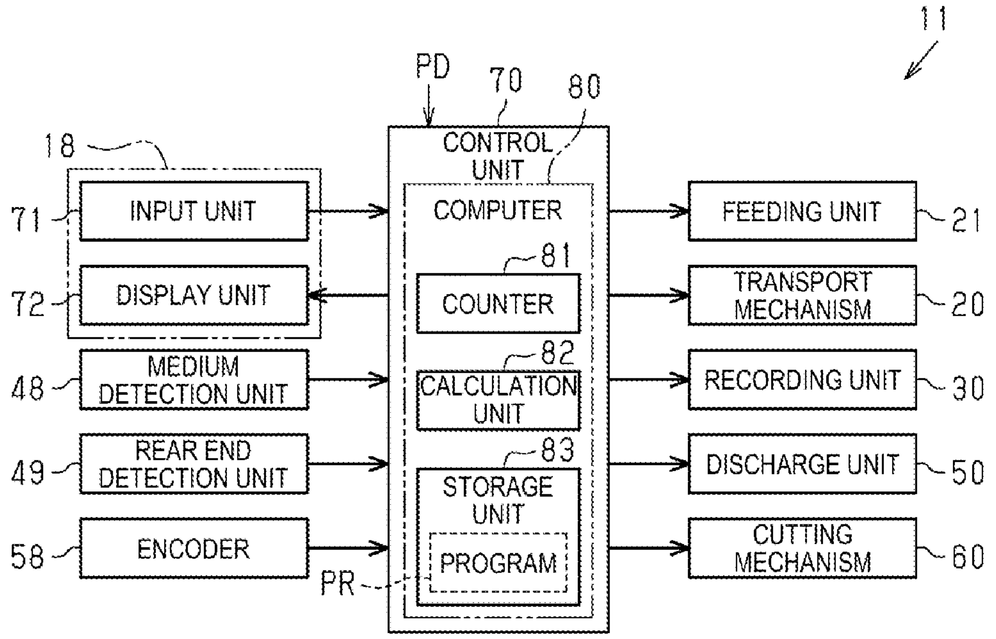
FIG. 10 is a block diagram illustrating an electrical configuration of the recording device.
Figure 11:
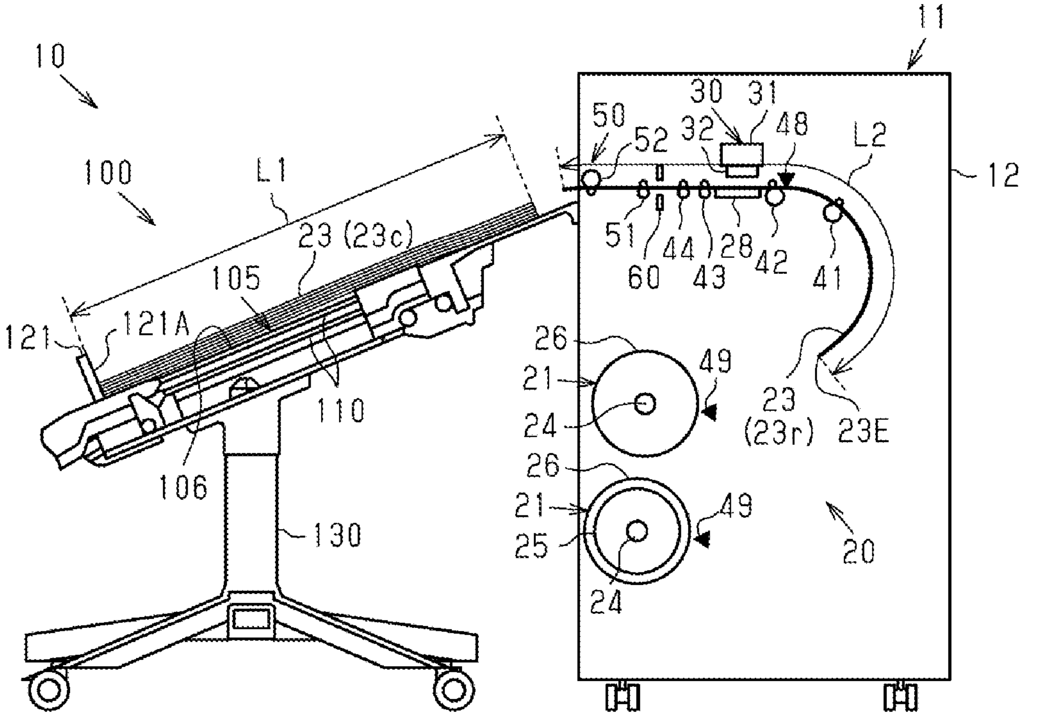
FIG. 11 is a schematic side view for explaining medium discharge length adjustment control in the recording system.

Next, an electrical configuration of the recording device 11 will be described with reference to FIGS. 10 and 11. The recording device 11 receives a recording job PD from, for example, a host apparatus (not illustrated). The recording job PD includes a plurality of jobs including recording condition information and recording image data. The recording condition information includes, for example, information such as a medium length. An input unit 71 and a display unit 72 that constitute the operation panel 18 are electrically coupled to the control unit 70. The user operates the input unit 71 to input recording condition information, etc. or to instruct execution of recording. A menu screen, etc. is displayed on the display unit 72. The display unit 72 may be configured by a touch panel, and at least a part of the input unit 71 may be configured by a touch operation mechanism of the touch panel. The recording device 11 includes, as one of the input units 71, a power button that is operated to turn on/off the power. Note that the input unit 71 may be a mechanical switch such as an operation button provided separately from the display unit 72.

In addition, a medium detection unit 48 and a rear end detection mechanism 49 are electrically coupled to the control unit 70.

The medium detection unit 48 detects the medium 23 at a position upstream of the recording unit 30 in the transport direction D. The medium detection unit 48 is configured by a sensor capable of detecting the presence or absence of the medium 23. The medium detection unit 48 detects, for example, the tip end or the rear end of the medium 23.

When all of the media 23 wound around the roll 25 are supplied, the rear end detection mechanism 49 detects the rear end of the medium 23. When the rear end detection mechanism 49 detects the rear end 23E of the medium 23, it is detected that the roll 25 is empty. Detection result information of the rear end detection mechanism 49 is output to the control unit 70. When the rear end detection mechanism 49 detects the rear end 23E of the medium 23, the control unit 70 recognizes that the roll 25 is empty. The rear end detection mechanism 49 may be a non-contact sensor such as an optical sensor, or may be a contact sensor having a switch lever, etc. that comes into contact with the medium 23.

In addition, an encoder 58 is electrically coupled to the control unit 70. The encoder 58 detects, for example, the rotation of the transport motor 56. The encoder 58 outputs a detection signal including a number of pulses proportional to the amount of rotation of the transport motor 56. The detection signal output from the encoder 58 is input to the control unit 70.

In addition, the feeding unit 21, the transport mechanism 20, the recording unit 30, the discharge unit 50, and the cutting mechanism 60 are electrically coupled to the control unit 70 as an output system.

The control unit 70 controls the recording head 32 to perform recording control for discharging ink from a nozzle of the recording head 32. In this example, since the recording unit 30 is a serial recording type, the control unit 70 controls the carriage motor 35 to move the carriage 31 in the scanning direction X, and causes the recording head 32 to perform recording on the medium 23 during the movement.

The control unit 70 controls the feeding motor 27 constituting the feeding unit 21 to rotationally drive the roll 25 in a feeding direction (supply direction). Accordingly, the medium 23 is supplied from the feeding unit 21 toward the recording position of the recording unit 30.

In addition, the control unit 70 controls the transport motor 56 constituting the transport mechanism 20 to transport the medium 23 by the transport roller pairs 41 to 44 (see FIG. 3).

The control unit 70 also controls the discharge motor 57 constituting the discharge unit 50 to cause the discharge roller pairs 51, 52 (see FIG. 3) to discharge the medium 23 cut to a specified length such as the predetermined length L1 after recording.

The control unit 70 controls the electric motor 66 constituting the cutting mechanism 60 to move the cutter blade 69 in the widthwise direction X, thereby cutting the medium 23 after recording into the predetermined length L1. When all of the media 23 wound on the roll 25 are supplied and the rear end 23E is detected by the rear end detection mechanism 49, the control unit 70 performs the next determination at a designated determination time thereafter. The control unit 70 calculates a remaining length L2 of the remaining medium 23*r* illustrated in FIG. 11. Then, as illustrated in FIG. 11, the control unit 70 determines whether or not the remaining length L2 of the remaining medium 23*r* is greater than the predetermined length L1 that allows placement at the placement unit 105 of the medium loading device 100. When the remaining length L2 is greater than the predetermined length L1, the control unit 70 cuts the medium 23*r* having the remaining length L2 to a predefined length L3. The predetermined length L1 is a length for cutting the medium 23 after recording, and is acquired from the recording job PD or the recording condition information input from the input unit 71. The predefined length L3 is equal to or less than the maximum allowable length Lmax. The value of the predefined length L3, etc. and the method of determining the cutting position will be described later.

The control unit 70 includes a computer 80. The computer 80 includes a counter 81, a calculation unit 82, and a storage unit 83.

The computer 80 of the control unit 70 is configured to include a central processing unit (CPU), a read only memory (ROM), a random access memory (RAM), and a storage, which are not illustrated. The control unit 70 controls the transport of the medium 23 in the recording device 11 and the recording operation of information about the medium 23 by the recording unit 30. Specifically, the control unit 70 is not limited to a unit that performs software processing for all processing executed by the control unit 70. For example, the control unit 70 may include a dedicated hardware circuit (for example, an application specific integrated circuit (ASIC)) that performs a hardware process for at least a part of the process executed by the control unit 70. That is, the control unit 70 can be configured as a circuit (circuitry) including one or more processors that operate in accordance with a computer program (software), one or more dedicated hardware circuits that execute at least some of various processes, or a combination thereof. The processor includes a CPU and the storage unit 83 such as a RAM and a ROM, and the storage unit 83 stores program codes or instructions configured to cause the CPU to execute processing. The storage unit 83 or a computer-readable medium includes any available media that can be accessed by the general purpose or special purpose computer 80.

The counter 81 counts a count value corresponding to the transport position of the medium 23 with the position at which the tip end of the medium 23 is detected by the medium detection unit 48 as the origin. When the medium 23 is cut by the cutting mechanism 60, the control unit 70 stops the medium 23 at a position where the cut position on the medium 23 reaches the cutting position of the cutting mechanism 60, and then drives the cutting mechanism 60.

The computer 80 of the control unit 70 includes the calculation unit 82. The control unit 70 calculates the length of the medium 23 from the cutting position to the end portion of the medium 23 using the count value of the counter 81. A length Lep on the transport path 29 between a medium detection position at which the medium detection unit 48 detects the medium 23 and a rear end detection position at which the rear end detection mechanism 49 detects the rear end of the medium 23 is known. In addition, a length Lpc on the transport path 29 between a medium detection position at which the medium detection unit 48 detects the medium 23 and a cutting position at which the cutting mechanism 60 cuts the medium 23 is known. In addition, the control unit 70 acquires information related to the predetermined length L1 for cutting the medium 23 after recording based on the recording condition information in the recording job PD.

When the rear end detection mechanism 49 detects the rear end of the medium 23 during recording, for example, the control unit 70 causes the calculation unit 82 to calculate the cut position at which the medium 23, on which recording is being performed, is to be cut to the predetermined length L1. Further, the calculation unit 82 calculates the remaining length L2 from the calculated cut position to the rear end of the medium 23.

In the present exemplary embodiment, when the rear end detection mechanism 49 detects the rear end of the medium 23, the page on which recording is performed at that time is taken as the final page. When that recording page is cut and discharged by the cutting mechanism 60, recording on the medium 23*r* having the remaining length L2 is not performed. At this time, the remaining medium 23 having the remaining length L2 on which recording is not performed may be discharged as it is, but in the present exemplary embodiment, the medium 23 having the remaining length L2 is cut so as to have a length equal to or less than the maximum allowable length Lmax according to the remaining length L2 at that time.

Accordingly, in a case where the medium loading device 100 is coupled to the recording device 11 and used as the recording system 10, the occurrence of jamming of the medium 23 in the placement unit 105 of the medium loading device 100 is suppressed.

The storage unit 83 stores a program PR. The program PR includes a program of a medium discharge length adjustment control routine illustrated by a flowchart in FIG. 12. The control unit 70 executes the medium discharge length adjustment control routine during recording.

The recording device 11 includes the rear end detection mechanism 49 that detects the rear end of the medium 23 in the transport path 29. The control unit 70 detects the remaining length of the medium 23 based on the output of the rear end detection mechanism 49.

Predetermined Length L1 and Predefined Length L3

The control unit 70 performs the following determination when recording is performed on the medium 23 and the medium 23 is cut to a predetermined length and discharged. In other words, when the control unit 70 determines that the remaining length L2 of the medium 23 is insufficient for recording and discharging and that the remaining length L2 is greater than the predetermined length L1, the control unit 70 cuts, by the cutting mechanism 60, the remaining medium 23*r* to the predefined length L3 or less and discharges the remaining medium 23*r*.

Specifically, the control unit 70 determines whether or not the following determination condition is satisfied. If the determination condition is satisfied, the control unit 70 cuts the medium 23 to the predefined length L3 or less and discharges the medium 23.

The determination condition is a condition that satisfies both of the following:

(a) When recording is performed on the medium 23 and the medium 23 is cut to the predetermined length L1, the remaining length L2 of the medium 23 is insufficient to discharge the medium 23.

(b) When the condition (a) is satisfied, the medium 23*r* having the remaining length L2 is discharged without performing recording, but the remaining length L2 is greater than the predetermined length L1.

When the conditions (a) and (b) are satisfied, the control unit 70 causes the cutting mechanism 60 to cut the remaining medium 23 to the predefined length L3 or less and discharge the medium 23. The condition (a) may be, for example, that when recording is performed on the medium 23 by the recording head 32, a length that allows recording in a state of pinching the medium 23 by the second transport roller pair 42 upstream of the recording unit 30 is insufficient.

The predetermined length L1 is a cut length at the time of recording. That is, the predetermined length L1 is a length for cutting the medium 23 after recording defined by the recording job PD currently being executed. In addition, when it is necessary to distinguish the medium 23, different reference numerals may be given. That is, the medium 23 having the predetermined length L1 is referred to as a medium 23*c*, and the medium 23 having the remaining length L2 is referred to as a medium 23*r*. When the remaining medium 23*r* is cut to the predefined length L3, the medium 23 having the predefined length L3 is referred to as a medium 23*r*1, and the medium 23 having the remaining length Lr(=L2-L3) is referred to as a medium 23*r*2.

The condition (a) may be determined from the situation without measuring or calculating the actual length. For example, when the rear end detection mechanism 49 detects the rear end 23E of the medium 23 supplied from the roll 25 during recording in which the recording unit 30 performs recording on the medium 23, it may be considered that the condition (a) is satisfied. In this case, depending on the predetermined length L1 defined by the recording job PD at that time, there may be a case where recording on one more sheet of the medium 23 having the predetermined length L1 can be performed even in the remaining length L2. However, the control unit 70 may determine whether or not the condition (b) is satisfied on the assumption that the condition (a) is satisfied, and cut the medium 23*r* having the remaining length L2 at the predefined length L3 if L2>L1 is satisfied. In this case, the control unit 70 may regard that the condition (a) is uniformly satisfied when the rear end detection mechanism 49 detects the rear end 23E of the medium 23 supplied from the roll 25 which is the supply source of the medium 23.

The timing at which the control unit 70 determines whether or not the above-described conditions (a) and (b) are satisfied may be when the rear end is detected by the rear end detection mechanism 49, when recording on the last medium 23 after recording in the roll 25 is completed, or when the last medium 23 after recording is cut or when cutting is completed. In short, when the control unit 70 determines that it is necessary to cut the medium 23*r* having the remaining length L2 to the predefined length L3, it is sufficient if the timing is in time to cut the medium.

Figure 15:
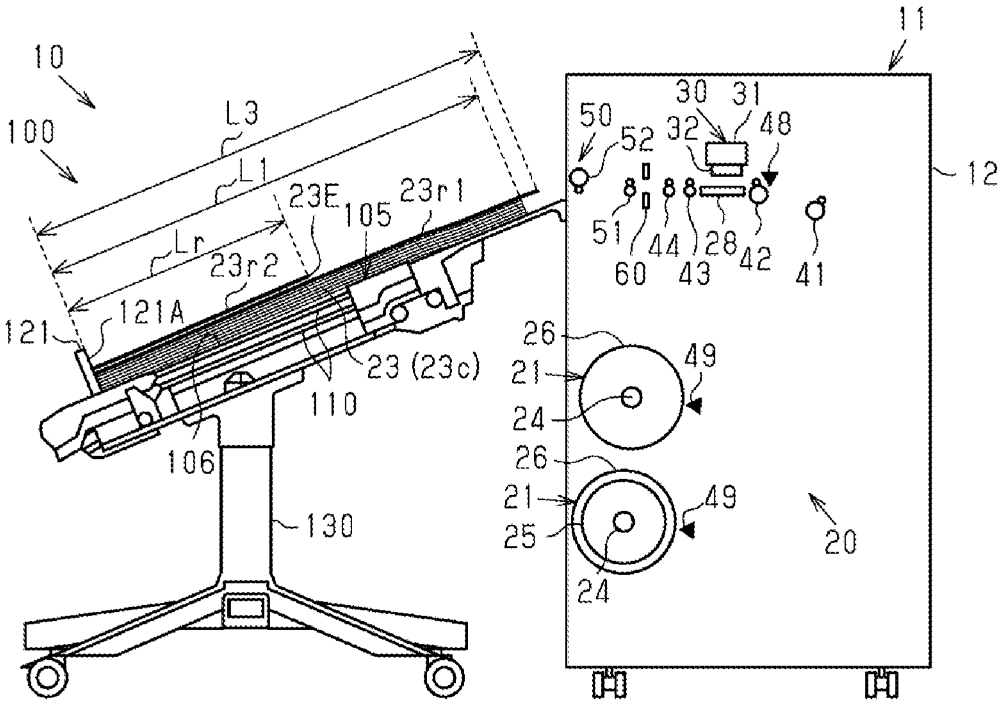
FIG. 15 is a schematic side view illustrating a state in which the medium cut by the medium discharge length adjustment control is loaded in the recording system.

When the condition (b) is satisfied, the control unit 70 cuts the medium 23*r* having the remaining length L2 into two, the medium 23*r*1 having the predefined length L3 and the medium 23*r*2 having the remaining length Lr, which is (L2-L3) (see FIG. 15). The remaining length L2 used in the determination (b) is calculated as a length from a cutting position where the recording-completed medium 23 is cut to the predetermined length L1 after completing recording when the rear end detection mechanism 49 detects the rear end of the medium 23, to the position of the rear end 23E of the medium 23 detected by the rear end detection mechanism 49.

Figure 9:
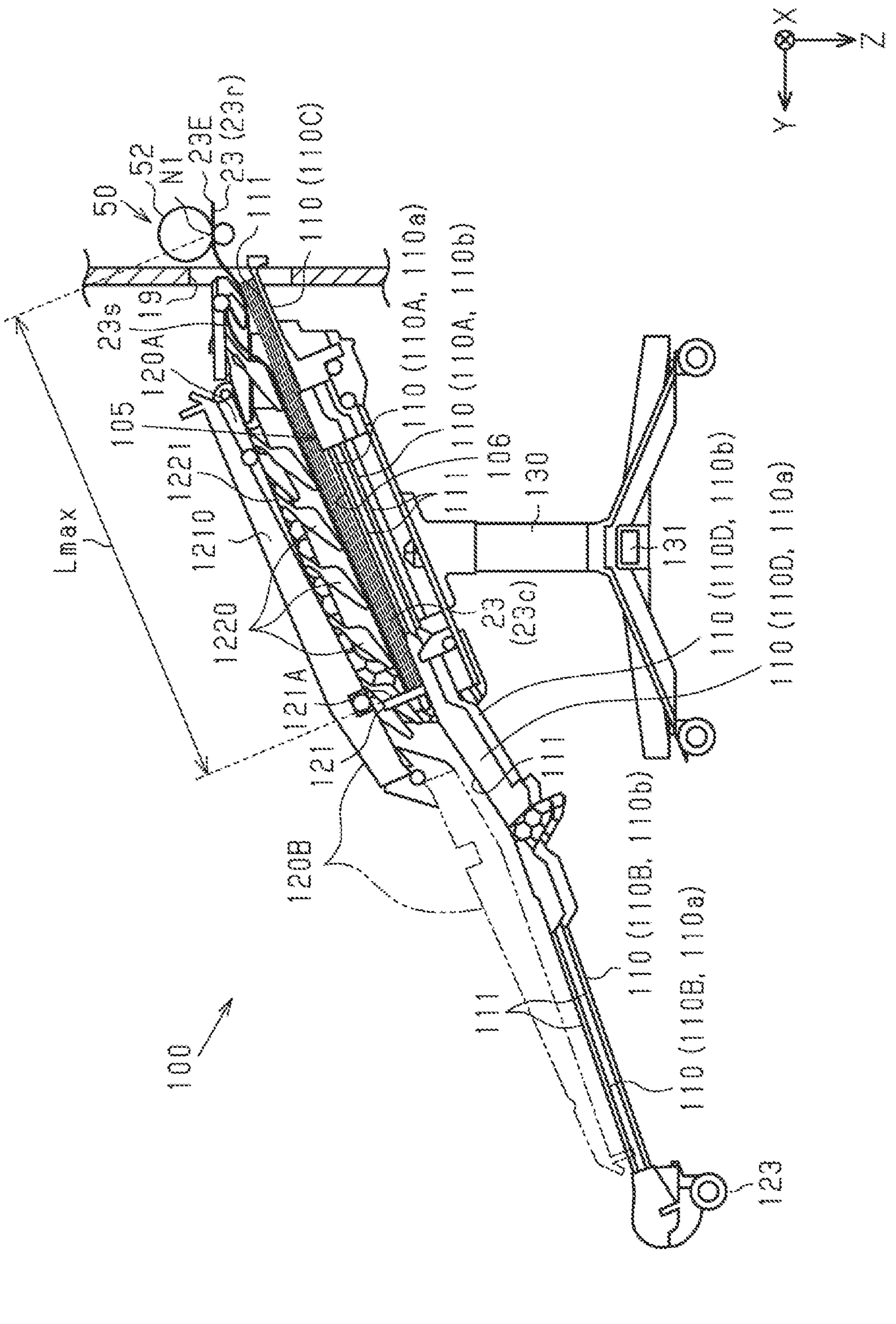
FIG. 9 is a schematic side cross-sectional view illustrating the medium loading device for explaining a maximum allowable length Lmax.

Here, the predefined length L3 is set to the maximum allowable length Lmax or less. As illustrated in FIG. 9, the maximum allowable length Lmax is defined as follows in the recording system 10. That is, the maximum allowable length Lmax is a length on the discharge path from a nip position N1 of the discharge roller pair 52 located on the most downstream on the transport path 29 among at least one (two in this example) discharge roller pairs 51, 52 constituting the discharge unit 50 of the recording device 11 to the restriction surface 121A of the restricting unit 121 positioned in accordance with the predetermined length L1 in the medium loading device 100. Therefore, the maximum allowable length Lmax changes depending on the position in the discharge direction A of the restricting unit 121 positioned in the medium loading device 100.

The maximum allowable length Lmax is longer than the predetermined length L1 for cutting the medium 23 on which recording is performed (Lmax>L1). The medium loading device 100 is a stacker that loads a large number of the media 23 after recording discharged from the discharge unit 50 of the recording device 11. Thus, in terms of the function of the stacker, the predetermined length L1, which is the length of the recording matter, needs to be a length such that the rear end of the medium 23 is completely discharged from the nip position N1 of the most downstream discharge roller pair 52 constituting the discharge unit 50. When the medium loading device 100 is used, the position of the restricting unit 121 is adjusted by the user to a position at which the medium 23*c* having the predetermined length L1 can be loaded on the placement unit 105.

Here, the reason for setting the predefined length L3 to a value that satisfies the condition L3≤Lmax is as follows. When the medium 23 having a length greater than the maximum allowable length Lmax is discharged from the discharge unit 50, the upstream portion of the medium 23 is nipped by the discharge roller pair 52 even if the downstream end of the medium 23 contacts the restriction surface 121A of the restricting unit 121. Therefore, the upstream portion of the medium 23 nipped by the discharge roller pair 52 is forcibly discharged downstream by the rotation of the discharge roller pair 52.

As illustrated in FIG. 9, when the upstream portion of the medium 23 is forcibly discharged downstream by the discharge roller pair 52, the upstream portion of the medium 23 is curved inside the medium loading device 100 to form a curved portion 23*s*. Thereafter, the roll 25 that is the supply source of the medium 23 is switched, and the medium 23 supplied from the new roll 25, on which recording has been performed and cut to the predetermined length L1, is discharged from the discharge port 19 into the medium loading device 100 as the subsequent medium 23.

When being discharged to the placement unit 105, the subsequent medium 23*c* collides with the curved portion 23*s* of the medium 23 loaded on the placement unit 105, and the path of the subsequent medium 23 is blocked, whereby causing jamming. The maximum allowable length Lmax is a maximum length of the medium 23 that does not create the curved portion 23*s* that causes this type of jamming. The predefined length L3 is set to be the maximum allowable length Lmax or less (L3≤Lmax). The predefined length L3 may be set to any value as long as the condition of L3≤Lmax is satisfied. That is, the predefined length L3 may be the same as the predetermined length L1, may be greater than the predetermined length L1, or may be smaller than the predetermined length L1.

In the present exemplary embodiment, the predefined length L3 is set to a value different from the predetermined length L1. If the predefined length L3 is set to a value different from the predetermined length L1, it is possible to easily recognize that the position at which the blank medium 23 is pinched is the switching position between the two rolls 25, due to the difference in length between the blank medium 23 and the recording matter as a product. For example, at the switching time of the roll 25, the occurrence frequency of the transport deviation, etc. is relatively higher than that in the normal time, and the position at which the blank medium pinched becomes a mark of the confirmation position of the recording position deviation, etc.

The user can recognize that a place where the blank medium 23 having a different length among a large number of the media 23 loaded on the medium loading device 100 is pinched is a place where the roll 25 is to be switched. By checking the recording result of the medium 23 before and after the blank medium is pinched, it is possible to check whether the automatic switching of the roll 25 is normally performed. In a case where the length of the blank medium 23 pinched at the predetermined position in the load of the medium 23 having the predetermined length L1 is different from the predetermined length L1 of the medium 23*c* as the product, the user is unlikely to forget to remove the blank medium 23 from the printing matters.

Figure 16:
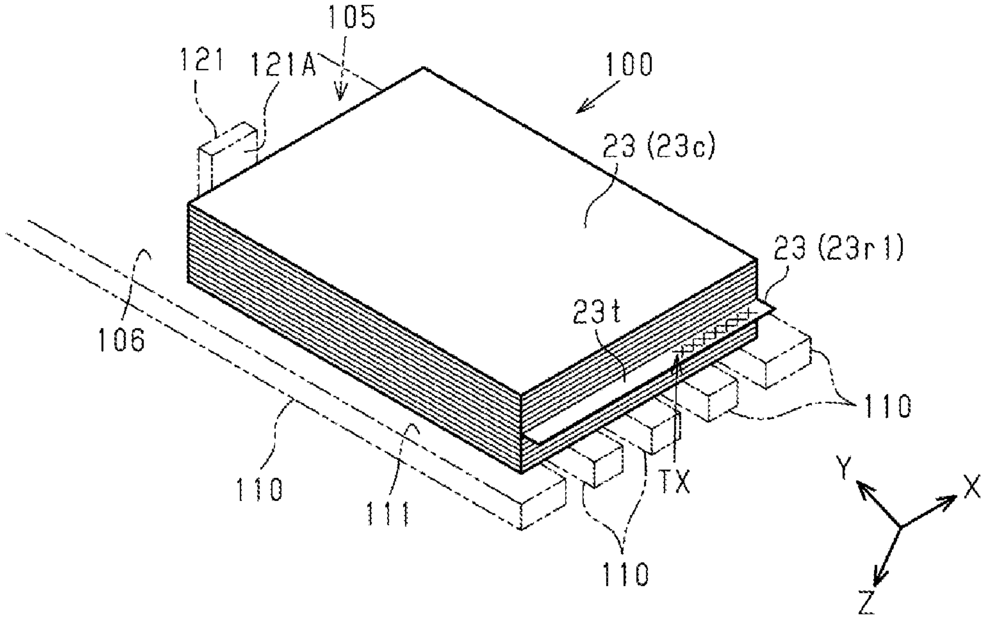
FIG. 16 is a schematic perspective view illustrating a medium loaded on a placement unit of the medium loading device.

When the control unit 70 causes the cutting mechanism 60 to cut the remaining medium 23*r* having the remaining length L2, the control unit 70 may cut the remaining medium 23*r* to a length greater than the predetermined length L1. That is, the predefined length L3 may be greater than the predetermined length L1. In a case where the predefined length L3 is greater than the predetermined length L1, as illustrated in FIG. 16, an end portion 23*t* of the blank medium 23 slightly protrudes from the recording matters loaded on the placement unit 105 of the medium loading device 100. Therefore, the user can find the blank medium 23 more easily than when the predefined length L3 is smaller than the predetermined length L1. As illustrated in FIG. 16, the control unit 70 may cause the recording unit 30 to record information TX indicating that the currently supplied roll 25 is finished at a recordable position in the range of the remaining length L2 of the medium 23. As illustrated in FIG. 16, the information TX recorded on the end portion 23*t* of the blank medium 23 protruding from the recording matters having the predetermined length L1 may be character information such as "end of upper side roll". Note that the information TX is not limited to character information, and may be a pattern, an illustration, a mark, etc., or a combination of these and character information.

When the control unit 70 causes the cutting mechanism 60 to cut the remaining medium 23*r* having the remaining length L2, the control unit 70 may cut the remaining medium 23*r* to the predetermined length L1 or less. That is, the predefined length L3 may be smaller than the predetermined length L1. Even in a case where the remaining medium 23*r* is cut to the predetermined length L1 or less, the control unit 70 may cause the recording unit 30 to record the information TX indicating that the currently supplied roll 25 is finished at a recordable position in the range of the remaining length L2 of the medium 23. The same applies to the case where the control unit 70 cuts the remaining medium 23*r* having the remaining length L2, to the same length as the predetermined length L1 by the cutting mechanism 60.

Minimum Dischargeable Length L4

As in the condition (a), if the remaining length L2 at the time of end detection is cut to the predefined length L3 into two pieces, i.e., the medium 23*r*1 having the predefined length L3 and the medium 23*r*2 having the remaining length Lr, the cut medium 23*r*2 having the remaining length Lr may not be transported. In order to discharge the cut medium 23*r*2 having the remaining length Lr, a minimum dischargeable length L4 is required. However, depending on the remaining length L2, when the medium 23*r* is cut to the predefined length L3, the remaining length Lr of the medium 23*r*2 that remains after cutting may be insufficient with respect to the minimum dischargeable length L4. The minimum dischargeable length L4 is a minimum length of the medium 23 that can be discharged from the discharge unit 50.

Here, the minimum dischargeable length L4 will be described with reference to FIG. 3. The roller pairs used for discharging the medium 23 cut by the cutting mechanism 60 are the plurality of discharge roller pairs 51, 52 constituting the discharge unit 50. The minimum dischargeable length L4 is a length on the transport path 29 corresponding to an interval (maximum interval) between a pair of rollers having the longest interval among the plurality of discharge roller pairs 51, 52. In the example illustrated in FIG. 3, the discharge roller pairs used for discharging the medium 23 after cutting are two discharge roller pairs 51, 52. Therefore, the minimum dischargeable length L4 is a length on the transport path 29 corresponding to a length between the two discharge roller pairs 51, 52. In a case where the discharge unit 50 includes one discharge roller pair, for example, in a case where the discharge roller pair 51 is not provided in FIG. 3, the minimum dischargeable length L4 is set as follows. That is, the minimum dischargeable length L4 is set to a length on the transport path 29 corresponding to the length between the discharge roller pair 52 and the transport roller pair 44 located first on the upstream in the transport direction D with respect to the cutting mechanism 60.

Adjustment of Predefined Length L3

The predefined length L3 is adjusted such that the remaining length Lr obtained by cutting the medium 23 having the remaining length L2 to the predefined length L3 is equal to or greater than the minimum dischargeable length L4 that can be discharged from the discharge unit 50. In the present exemplary embodiment, whether or not to cut and the predefined length L3 in the case of cutting may be adjusted in accordance with the following condition (c). That is, when the above conditions (a) and (b) are satisfied, the predefined length L3 is adjusted so as to satisfy the following condition (c).

(c) When the medium having the remaining length L2 is cut to the predefined length L3, in a case where the remaining length Lr(=L2-L3) is the minimum dischargeable length L4 or less, the predefined length L3 is adjusted to be smaller so that the remaining length Lr is equal to or greater than the minimum dischargeable length L4.

For example, it is assumed that the remaining length L2 at the time of the rear end detection is 70 cm and the predefined length L3 is 50 cm. In this case, the remaining medium 23*r* is cut into two pieces, i.e., the medium 23*r*1 having the predefined length L3 of 50 cm and the medium 23 having the remaining length Lr of 20 cm. However, if the remaining length Lr of 20 cm is less than the minimum dischargeable length L4 and the remaining medium 23*r*2 of the medium cannot be discharged, the predefined length L3 is adjusted to be smaller, for example, set to 40 cm. As a result, the medium 23 having the remaining length L2 at the time of end detection are cut into two pieces, i.e., the medium 23*r*1 having 40 cm, which is a length after adjustment of the predefined length L3, and the remaining medium 23*r*2 having the remaining length Lr of 30 cm.

Further, the predefined length L3 may be set to a length of the longest medium of the job among the recording jobs PD. Here, one recording job PD may include a plurality of jobs including recording images and recording conditions. The recording condition includes information about the length of the medium. For this reason, the recording job PD may include a plurality of jobs having a plurality of different medium lengths as recording conditions. In a case where such a recording job PD is being executed, the control unit 70 sets, as the predefined length L3, a length of the medium of the job having a length of the longest medium among the recording jobs PD.

In this case, when the predefined length L3 is set to be different from the predetermined length L1, the predefined length L3 may be set to a length greater than the medium length of the job having the longest medium length among the recording jobs PD. For example, when the different length is Ld, the predefined length L3 is set to be greater by the different length Ld than the length of the medium set in the job having the longest medium among the recording jobs PD. Note that the predefined length L3 may be set to be smaller by the different length Ld than the length of the medium set for the job having the longest medium. The different length Ld is, for example, a value in a range of 5 to 100 mm. The different length Ld may be a value outside this range.

Operation of Exemplary Embodiment

Next, the operation of the present exemplary embodiment will be described.

The user operates the input unit 71 of the operation panel 18 to instruct the recording job PD on the menu screen displayed on the display unit 72. When receiving the instruction of the recording job PD, the control unit 70 causes the recording device 11 to perform the recording operation based on the recording job PD.

The control unit 70 controls the feeding unit 21 and the transport mechanism 20 based on the recording job PD to transport the medium 23 from one of the rolls 25. The control unit 70 controls the recording unit 30 based on the recording job PD to perform recording on the medium 23. Further, the control unit 70 controls the cutting mechanism 60 based on the recording job PD to cut the medium 23 after recording into the predetermined length L1 by the cutting mechanism 60. The control unit 70 controls the discharge unit 50 to discharge the medium 23 from the discharge port 19.

The medium 23 cut to the predetermined length L1 is discharged to the medium loading device 100. In the medium loading device 100, the tip end of the medium 23 discharged from the discharge unit 50 comes into contact with the restricting unit 121, so that the medium 23 is placed at a predetermined position in the discharge direction A. In this manner, the medium 23 having the predetermined length L1 that is sequentially discharged is loaded on the placement unit 105 in a state in which the position of the end portion in the discharge direction A is aligned.

When the medium 23 of one roll 25 of the two mounted rolls 25 runs out, the control unit 70 switches the roll 25 of the feeding source to the other roll 25. The switching of the roll 25 from one to the other is automatically performed. At this time, when one of the rolls 25 runs out of the medium 23, the medium 23 having the remaining length L2 after the last recording and cutting is finished is discharged without recording. However, there may be a case where the discharged medium 23 having the remaining length L2 is greater than the maximum allowable length Lmax. In this case, in a state in which the downstream end in the discharge direction A of the medium 23 discharged to the medium loading device 100 is in contact with the restriction surface 121A of the restricting unit 121, the portion on the upstream in the discharge direction A is located further upstream than the nip position N1 of the most downstream discharge roller pair 52. In this state, the medium 23 nipped by the most downstream discharge roller pair 52 is forcibly pushed out to the downstream by the rotation of the most downstream discharge roller pair 52. In this case, as illustrated in FIG. 9, the remaining medium 23*r* having the remaining length L2 is bent to form the curved portion 23*s*. After that, the subsequent medium 23, on which recording has been performed, is supplied from the next new roll 25 and cut into the predetermined length L1, and is discharged from the recording device 11 to the medium loading device 100. The downstream end of the subsequent medium 23 discharged into the medium loading device 100 is in contact with the curved portion 23*s* and the path of the medium 23 is blocked, whereby causing jamming.

In order to reduce this type of jamming, the control unit 70 of the present exemplary embodiment executes cut control to cut the medium 23*r* having the remaining length L2 greater than predetermined length L1, particularly the medium 23*r* having a length greater than the maximum allowable length Lmax, to the predefined length L3 by the cut mechanism 60. In this manner, by adjusting the discharge length when the remaining medium 23*r* is discharged, jamming is suppressed.

Figure 12:
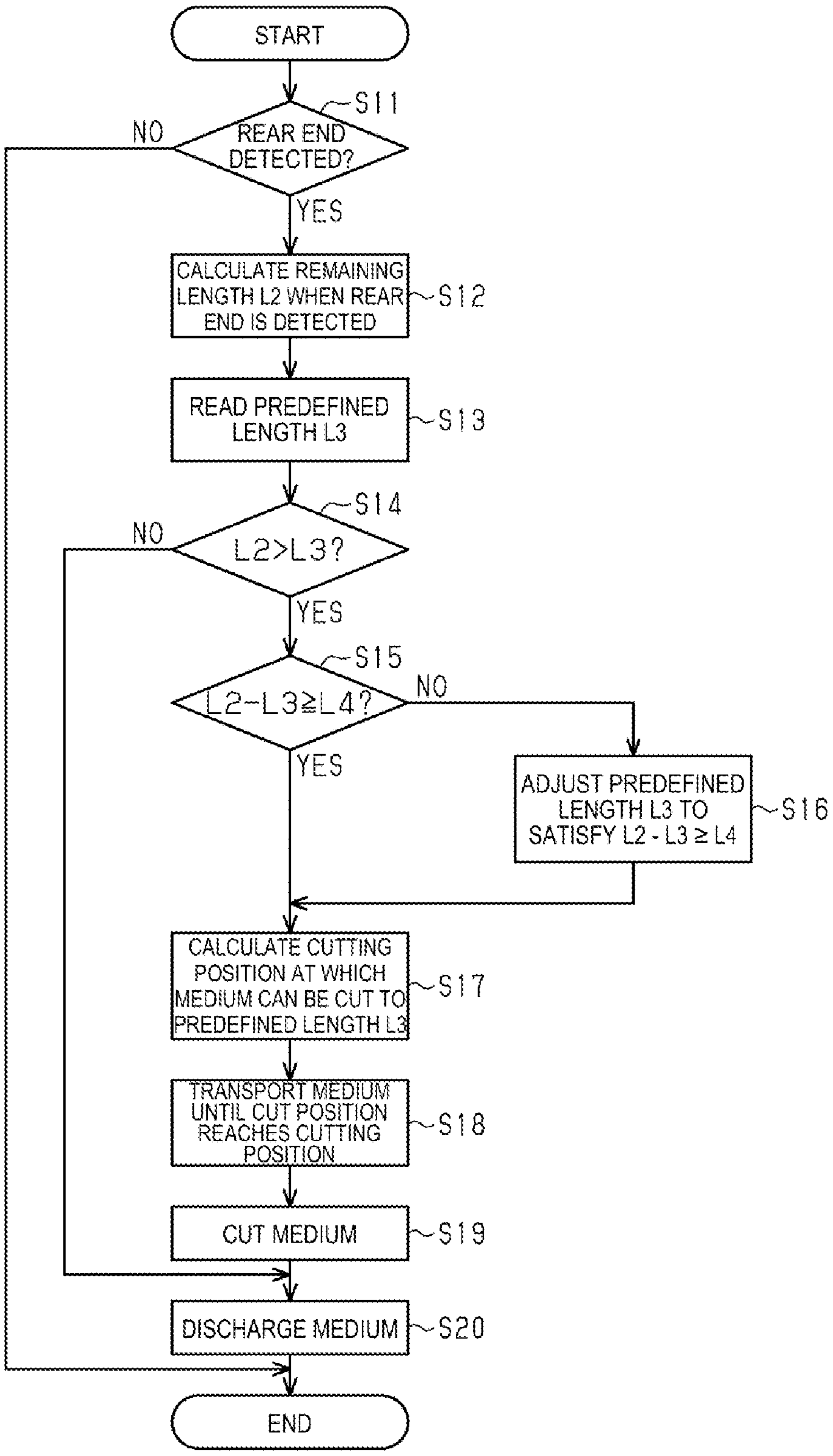
FIG. 12 is a flowchart illustrating a medium discharge length adjustment control routine.

Hereinafter, the medium discharge length adjustment control executed by the control unit 70 during recording will be described with reference to FIG. 12, etc.

Figure 13:
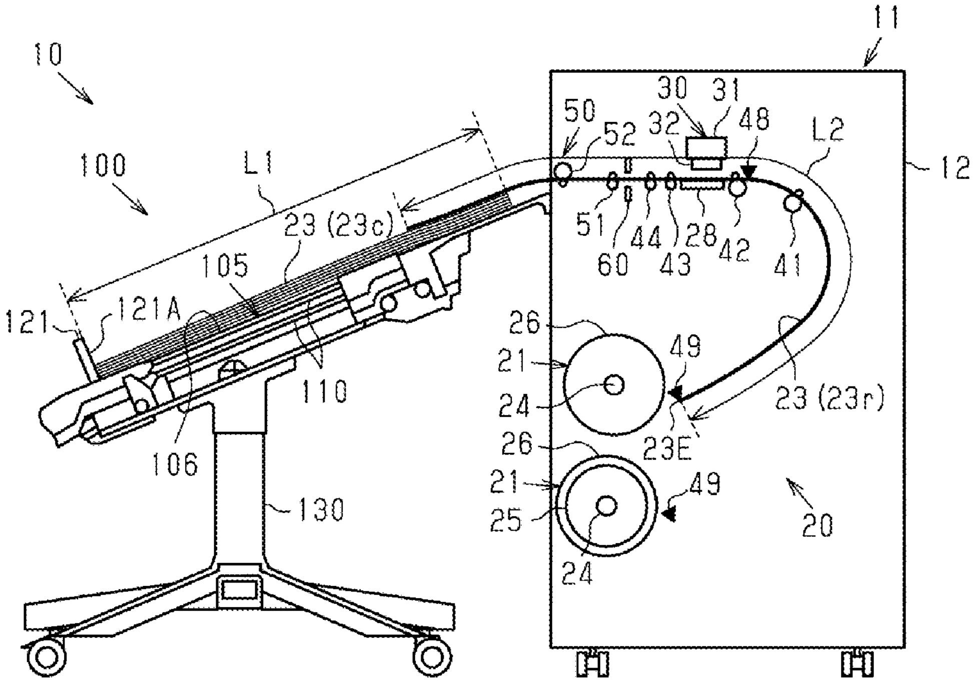
FIG. 13 is a schematic side view for explaining medium discharge length adjustment control in the recording system.

In step S11, the control unit 70 determines whether or not the rear end is detected. If the rear end is detected, the control unit 70 proceeds to step S12, and if the rear end is not detected, the control unit 70 ends the routine. For example, as illustrated in FIG. 13, when all of the media 23 are supplied from the roll 25, the rear end 23E of the medium 23 separated from the core body 24 is detected by the rear end detection mechanism 49.

In step S12, the control unit 70 calculates the remaining length L2 when the rear end is detected. The detection position when the rear end detection mechanism 49 detects the rear end 23E is known information. The cut position at which the medium 23 after recording is finally cut can be obtained by calculation. The control unit 70 calculates the length on the transport path 29 between the rear end detection position and the cut position at which the medium 23 after recording is cut last as the remaining length L2 when the rear end is detected. That is, the process of step S12 corresponds to a process in which the control unit 70 calculates the remaining length L2 in which the remaining length L2 of the medium 23 is insufficient to perform recording in a state of pinching the medium 23 by the transport roller pair 42 when recording is performed on the medium 23 and the medium 23 is cut to the predetermined length L1 and discharged.

In step S13, the control unit 70 reads the predefined length L3. That is, the control unit 70 reads data of the predefined length L3 from the predetermined storage area of the storage unit 83.

In step S14, the control unit 70 determines whether or not L2>L3 is satisfied. That is, the control portion 70 determines whether or not the remaining length L2 at the time of the rear end detection is greater than the predefined length L3. If L2>L3 is satisfied, the control unit 70 proceeds to step S15, and if L2>L3 is not satisfied, the control unit 70 ends the routine. In other words, if L2>L3 is not satisfied, the medium 23 having the remaining length L2 is discharged to the medium loading device 100 as it is. For example, in the example illustrated in FIG. 13, the remaining length L2 is greater than the predefined length L3, and the condition L2>L3 is satisfied.

The process of step S14 corresponds to a process of determining whether or not the remaining length L2 is greater than the predetermined length L1. In this example, the predefined length L3 is set to a value different from that of the predetermined length L1. Therefore, whether or not the condition of L2>L1 is satisfied is determined by determining whether or not the condition of L2>L3 is satisfied. If the predefined length L3 is L3=L1, it is determined in step S14 whether or not L2>L1 is satisfied. When the predefined length L3 is different from the predetermined length L1, and L3>L1, where L3 is set to be greater than the predetermined length L1 by the different length Ld, it is determined in step S14 whether or not L2>L3 is satisfied. Also, when the predefined length L3 is different from the predetermined length L1, and L3>L1, where L3 is set to a value smaller than the predetermined length L1 by the different length Ld, it is determined in step S14 whether or not L2>L3 is satisfied.

In step S15, the control unit 70 determines whether or not L2-L3≥L4 is satisfied. That is, the control unit 70 determines whether or not the length (=L2-L3) obtained by subtracting the predefined length L3 from the remaining length L2 at the time of detecting the rear end is equal to or greater than the minimum dischargeable length L4. That is, in a case where the medium 23 having the remaining length L2 is cut to the predefined length L3, it is determined whether or not the medium 23 having the remaining length Lr(=L2-L3) after the cutting is equal to or greater than the minimum dischargeable length L4 and can be transported for discharge. If L2-L3≥L4 is not satisfied, the control unit 70 proceeds to step S16, and if L2-L3≥L4 is satisfied, the control unit 70 proceeds to step S17.

In step S16, the control unit 70 adjusts the predefined length L3 so as to satisfy L2-L3≥L4. That is, the control unit 70 adjusts the predefined length L3 to a length within a range that satisfies L3≤L2-L4. For example, when a margin length is Lα, the predefined length L3 is adjusted to L3=L2-L4-Lα. Accordingly, if the medium 23 having the remaining length L2 is cut to the adjusted predefined length L3, the remaining length Lr after the cutting become the length L4+Lα. In other words, the remaining length Lr can be set to the sum of the minimum dischargeable length L4 and the margin length Lα. Therefore, a length of the medium 23*r*1 cut to the predefined length L3 after the adjustment and the remaining length Lr of the medium 23*r*2 after the cutting are both equal to or greater than the minimum dischargeable length L4, and thus the two pieces of media 23*r*1 and 23*r*2 after the cutting can be sequentially discharged to the medium loading device 100.

In this case, since the medium 23 having the remaining length L2 at the time of the rear end detection is cut to the predefined length L3 or less by the adjusted length, the cut medium 23*r*1 may have a length equal to the predetermined length L1 or smaller than the predetermined length L1. Even if the lengths are adjusted in this manner, the adjusted predefined length L3 is smaller than the maximum allowable length Lmax. Thus, when the first medium 23*c* after switching the roll 25 is discharged as the subsequent medium 23*c* after recording, the occurrence of jamming in the medium loading device 100 is suppressed.

In step S17, the control unit 70 calculates a cut position at which the medium can be cut to the predefined length L3. The control unit 70 calculates, as the cut position, a position upstream in the transport direction D by the predefined length L3 from the cutting position of the last medium 23 after recording.

Figure 14:
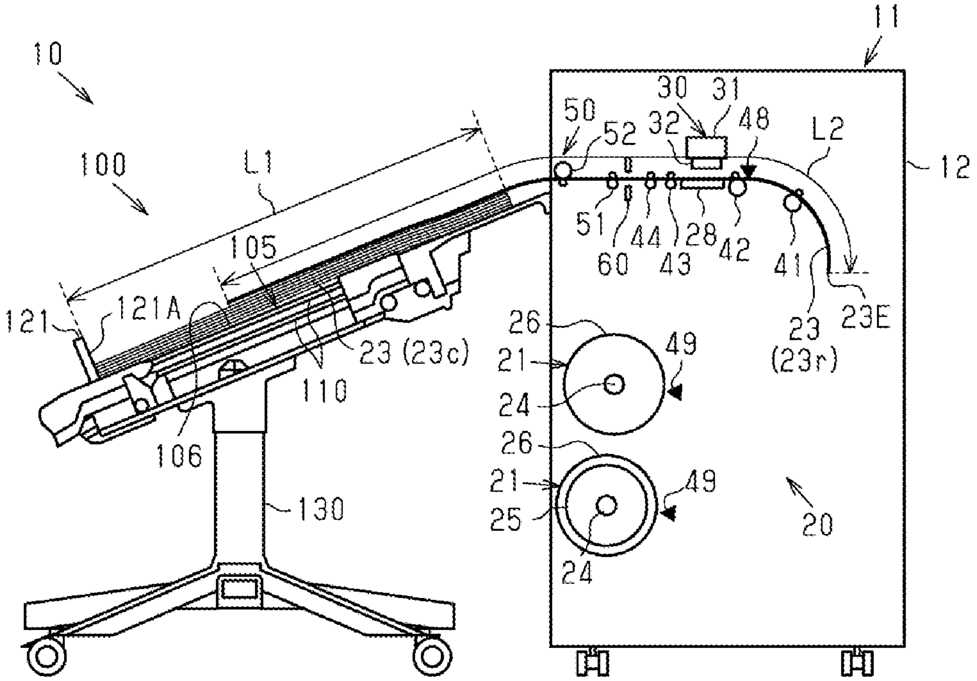
FIG. 14 is a schematic side view illustrating a state in which the medium is transported to a cutting position by the medium discharge length adjustment control in the recording system.

In step S18, the control unit 70 transports the medium until the cut position reaches the cutting position. That is, the control unit 70 transports the medium 23 having the remaining length L2 to a position where the cut position of the medium 23 coincides with the cutting position of the cutting mechanism 60. As a result of this transport, as illustrated in FIG. 14, the medium 23*r* is transported to a position where the cut position coincides with the cutting position, and stops.

In step S19, the control unit 70 cuts the medium. That is, when the medium 23 having the remaining length L2 stops at a position where the cut position of the medium 23 coincides with the cutting position of the cutting mechanism 60, the control unit 70 drives the cutting mechanism 60 to cut the medium 23*r* having with the remaining length L2. As a result, the medium 23*r* having the remaining length L2 is cut into the medium 23*r*1 having the predefined length L3 and the medium 23*r*2 having the remaining length Lr. At this time, the remaining length Lr of the medium 23*r*2 is greater than or equal to the minimum dischargeable length L4.

In step S20, the control unit 70 discharges the medium. That is, the control unit 70 drives the transport motor 56 or the discharge motor 57 to rotate the discharge roller pairs 51, 52 constituting the discharge unit 50. As a result, the medium 23*r*1 having the predefined length L3 and the medium 23*r*2 having the remaining length Lr are sequentially discharged from the discharge port 19 of the recording device 11. The media 23*r*1 and 23*r*2 discharged from the recording device 11 are sequentially discharged into the medium loading device 100. For example, as illustrated in FIG. 15, the medium 23*r* having the remaining length L2 is cut into two pieces, the medium 23*r*1 having the predefined length L3 and medium 23*r*2 having the remaining length Lr, and each of them is respectively loaded on the medium 23*c* having the predetermined length L1 that has been loaded on the placement unit 105.

In this manner, when the condition of L2>L3 is satisfied, the medium 23 having the remaining length L2 at the time of the rear end detection is cut into two pieces, the media 23 having the predefined length L3 and the remaining length Lr. After that, even when the medium 23 after recording is discharged from the next roll 25 to the placement unit 105 of the medium loading device 100, the occurrence of jamming in the medium loading device 100 is avoided. In this manner, it is possible to reduce the occurrence frequency of the jamming of the medium 23 which is likely to occur when the roll 25 is switched.

Advantages of Exemplary Embodiment

Advantages of the exemplary embodiment will be described.

(1) The recording device 11 includes the roll holding unit 26, the transport mechanism 20, the recording unit 30, the cutting mechanism 60, the discharge unit 50, and the control unit 70. The roll holding unit 26 holds the roll 25 on which a long medium 23 is wound around a core body 24. The transport mechanism 20 transports the medium 23 supplied from the roll 25 in the transport direction D along a transport path 29. The recording unit 30 performs recording on the transported medium 23 in the transport path 29. The cutting mechanism 60 cuts the medium 23 on which recording is performed by the recording unit 30 in the intersecting direction X intersecting the transport direction D. The discharge unit 50 discharges the medium 23 cut by the cutting mechanism 60. The transport mechanism 20 includes a transport roller pair 42 disposed upstream of the recording unit 30 in the transport path 29. When the control unit 70 determines that the remaining length L2 of the medium 23 is insufficient to perform recording in a state of pinching the medium 23 by the transport roller pair 42 and that the remaining length L2 is greater than the predetermined length L1 upon performing recording on the medium 23, cutting the medium 23 to the predetermined length L1, and discharging the medium 23, the control unit 70 cuts, by the cutting mechanism 60, the remaining medium 23*r* to the predefined length L3 or less and discharges the remaining medium 23*r*. According to this configuration, it is possible to suppress jamming of the discharged medium 23. For example, in a case where the medium loading device 100 is coupled to the discharge unit 50 of the recording device 11, it is possible to suppress jamming of the medium 23 discharged to the medium loading device 100. In particular, in a case where the medium loading device 100 includes the restriction surface 121A with which the tip end of the medium 23 discharged from the discharge unit 50 comes into contact in order to align the position of the medium 23 in the discharging direction A, it is possible to prevent the medium 23 having the tip end whose position is restricted by the restriction surface 121A and having a length that is greater than the predetermined length from being jammed in the medium loading device 100.

(2) The predefined length L3 is a length of the medium 23 of the job having the longest medium 23 among the recording jobs PD. According to this configuration, in a case where the recording job PD includes a plurality of jobs for instructing the lengths of the media 23 individually for a plurality of pieces of recording, when at least two pieces of recording among the plurality of pieces of recording have different lengths of the media 23, the predefined length L3 is determined in accordance with the job having the longest length. Therefore, for example, it is possible to suppress jamming in the medium loading device 100.

(3) The predefined length L3 is equal to or greater than the minimum length L4 that allows the cut remaining length Lr to be discharged from the discharge unit 50. According to this configuration, a plurality of the media 23 obtained by cutting the remaining length of the medium 23 can be discharged from the discharge unit 50.

(4) The plurality of roll holding units 26 are disposed, and continuous recording can be performed on the medium 23 held by the plurality of roll holding units 26. According to this configuration, since it is possible to continuously perform recording on the medium 23 held by the plurality of roll holding units 26, the productivity of the recording matter is improved.

(5) The rear end detection mechanism 49 that detects the rear end 23E of the medium 23 is provided in the transport path 29, and the control unit 70 detects the remaining length L2 of the medium 23 based on the output of the rear end detection mechanism 49. According to this configuration, when the rear end 23E of the medium 23 is detected by the rear end detection mechanism 49, the remaining length is known, so the control unit 70 can detect the remaining length L2 of the medium 23.

(6) The control unit 70 causes the recording unit 30 to record information indicating that the currently supplied roll 25 is finished at a recordable position in the range of the remaining length L2 of the medium 23. According to this configuration, it is possible to know that the currently supplied roll 25 is finished from the content recorded at the recordable position in the range of the remaining length L2 of the medium 23. It is possible to clarify that the image is not blank due to some error.

(7) The recording system 10 includes the recording device 11 described in (1) and the medium loading device 100. The medium loading device 100 includes the placement unit 105 on which the medium 23 discharged from the discharge unit 50 of the recording device 11 can be loaded, and the restricting unit 121 that restricts the medium 23 loaded on the placement unit 105 from moving downstream in the discharge direction A. When the control unit 70 determines that the remaining length L2 of the medium 23 is insufficient to perform recording in a state of pinching the medium 23 by the transport roller pair 42 and that the remaining length L2 is greater than the placeable length at the placement unit 105 upon performing recording on the medium 23, cutting the medium 23 to the predetermined length L1, and discharging the medium 23, the control unit 70 cuts, by the cutting mechanism 60, the remaining medium 23*r* to the placeable length at the placement unit 105 and discharges the remaining medium 23*r*.

According to this configuration, it is possible to suppress jamming of the discharged medium 23. For example, in a case where the medium loading device 100 is coupled to the discharge unit 50 of the recording device 11, it is possible to suppress jamming of the medium 23 discharged to the medium loading device 100. In particular, in a case where the medium loading device 100 includes the restriction surface 121A with which the tip end of the medium 23 discharged from the discharge unit 50 comes into contact in order to align the position of the medium 23 in the discharging direction A, it is possible to prevent the medium 23 having the tip end whose position is restricted by the restriction surface 121A and having a length that is greater than the predetermined length L1 from being jammed in the medium loading device 100.

(8) In the recording system 10, when the remaining medium 23*r* is cut by the cutting mechanism 60, the control unit 70 cuts the remaining medium 23*r* to the predetermined length L1 or less. According to this configuration, it is possible to reliably load the medium 23 discharged from the discharge unit 50 of the recording device 11 on the placement unit 105 of the medium loading device 100.

(9) In the recording system 10, when the remaining medium 23*r* is cut by the cutting mechanism 60, the control unit 70 cuts the remaining medium 23*r* to a length greater than the predetermined length L1. According to this configuration, the medium 23 at the boundary between the preceding roll 25 and the following roll 25 protrudes like a tab, and thus serves as a mark. Since the mark is provided, for example, it is easy to find the medium 23 from among the loaded group of media 23.

(10) In the control method for the recording device 11 including the roll holding unit 26, the transport mechanism 20, the recording unit 30, the cutting mechanism 60, the discharge unit 50, and the control unit 70, the following is performed. When the control unit 70 determines that the remaining length L2 of the medium 23 is insufficient to perform recording in a state of pinching the medium 23 by the transport roller pair 42 and that the remaining length L2 is greater than the predetermined length L1 upon performing recording on the medium 23, cutting the medium 23 to the predetermined length L1, and discharging the medium 23, the remaining medium 23*r* is cut to the predefined length L3 by the cutting mechanism 60 and discharges the remaining medium 23*r*. According to this method, it is possible to suppress jamming of the discharged medium 23. For example, in a case where the medium loading device 100 is coupled to the discharge unit 50 of the recording device 11, it is possible to suppress jamming of the medium 23 discharged to the medium loading device 100.

The present embodiment can be modified and implemented as follows. The present embodiment and the following modifications can be combined and implemented within a technically consistent range.

In the exemplary embodiment, the predefined length L3 may be the same as the predetermined length L1 or may be smaller than the predetermined length L1. In short, the predefined length L3 may be equal to or less than the maximum allowable length Lmax. If the condition of L3≤Lmax is satisfied, it is possible to reduce the occurrence frequency of jamming when the medium 23 after recording is discharged to the medium loading device 100 from the next switched roll 25 after the medium 23 on which recording is not performed is finally discharged from the roll 25. That is, since the last medium 23 discharged on which recording is not performed has a length equal to or less than the allowable maximum length Lmax, the last medium 23 is not bent, curved, and floated in the medium loading device 100. Therefore, even when the subsequent medium 23, on which recording is performed, supplied from the next roll 25 after the switching is discharged into the medium loading device 100, whereby jamming does not occur. The medium 23 after recording supplied from the next roll 25 is loaded on the last medium 23.

The rear end of the medium 23 may be detected by the medium detection unit 48 instead of the rear end detection mechanism 49. In this case, the rear end detection mechanism 49 may be omitted. According to this configuration, when the medium detection unit 48 detects the rear end 23E of the medium 23, the frequency of cases increases in which recording on the remaining medium 23 has already proceeded and recording is in progress. In this case, when the length of the medium 23 is insufficient to be transported, recording on the medium 23 having the remaining length is wasted until the rear end is detected, and ink is wastefully consumed. However, it is possible to reduce the occurrence frequency of the jamming of the medium 23 which is likely to occur when the roll 25 is switched in the medium loading device 100.

Instead of performing the last recording in which the medium 23*c* on which recording is being performed is cut into the predetermined length L1 when the rear end is detected, it may be determined whether or not recording can be performed on the medium 23 corresponding to the predetermined length L1 from the remaining length L2. Even when the last recording is started on the medium 23 for the predetermined length L1 after the rear end is detected, it is determined whether or not the medium 23 can be transported by the remaining length Lr after the medium 23 is cut to the predetermined length L1. As long as the remaining length Lr is the transportable length, the last recording may be started even after the detection of the rear end.

In the exemplary embodiment, in the recording device 11, the two rolls 25 can be mounted, and when the medium 23 of one roll 25 runs out, the medium 23 is automatically fed from the other roll 25. However, instead of this, when the medium 23 of one roll 25 runs out, a user may manually switch a feeding source for feeding the medium 23 from the other roll 25. In this case, the number of rolls 25 that can be mounted on the recording device 11 may be two or one.

A configuration in which the cutting mechanism 60 is disposed at substantially the same position as the most downstream discharge roller pair 52 or a configuration in which the cutting position of the cutting mechanism 60 is set at a position downstream of the most downstream discharge roller pair 52 may be employed. In this configuration, the determination process in step S15 and the process of resetting the cut position in step S16 may be omitted.

The recording device 11 is not limited to being used as the recording system 10 in combination with the medium loading device 100. For example, even in a configuration in which there is no restricting unit such as a stopper that causes jamming, the medium discharge length adjustment control described above may be performed in the recording device 11. For example, even in a configuration in which the medium 23 is dropped into a bucket and loaded, by cutting the length of the medium 23 on which recording is not performed in the rear end portion to the predefined length different from the predetermined length L1, even when the medium 23 on which recording is not performed due to switching of the roll 25 is mixed, it is possible to easily avoid forgetting to remove the medium 23 on which recording is not performed.

The cutting mechanism 60 is not limited to the configuration illustrated in FIG. 4. Other types of cutting mechanisms may be used. For example, a method may be used in which a movable blade and a fixed blade, each of which is long and has a longer dimension than the width dimension of the medium 23, are provided on both sides of the surface of the medium 23, and the medium 23 is cut by the movable blade moving toward the fixed blade to the cutting position. Further, the cutting mechanism 60 may be configured to be able to cut the medium 23 in both directions of the forward movement and the backward movement of the cutter blade 69.

In the above-described exemplary embodiment, when the remaining length L2 is greater than the predetermined length L1, the medium 23*r* having the remaining length L2 is cut to the predefined length L3 and cut into two media, but the medium 23*r* having remaining length may be cut into three or more media. In this case, if each of the three or more cut media has a length equal to or greater than the minimum dischargeable length L4, all of the media can be discharged by the discharge unit 50.

In the recording device 11, the rear end detection mechanism 49 may be omitted, and the rear end 23E may be detected by the medium detection unit 48. In other words, the medium detection unit 48 may also function as a rear end detection unit that detects the rear end 23E of the medium 23.

The cutting mechanism 60 may be provided outside the housing. For example, the cutting mechanism 60 may be configured to cut the medium 23 discharged from the discharge port 19 at a position downstream of the discharge port 19 in the discharge direction A. Further, the cutting mechanism 60 may be provided at a position upstream of the recording unit 30 in the transport direction D. In this case, the medium 23 may be cut to the predetermined length L1 in the middle of recording, or the medium 23 may be cut to the predetermined length L1 before the start of recording.

The recording device 11 is not limited to a serial printer, and may be a line printer or a page printer. In a case where the recording device 11 is a line printer, the recording unit 30 does not include the carriage 31 and includes a recording head capable of simultaneously recording a range longer than the maximum width of the medium 23. The recording head 32 performs recording on the medium 23 transported at a predetermined speed by the transport mechanism 20.

The recording device 11 is not limited to an ink jet printer and may be an electrophotographic printer such as a laser printer. Further, the recording device 11 may be a dot impact printer or a thermal transfer printer.

The recording device 11 may be an ink jet type textile recording device.

The recording device 11 may include an image reading unit (scanner), or may be a printer that does not include an image reading unit and has only a recording function. In a case where the recording device 11 includes an image reading unit, the recording device 11 may be a multifunction peripheral.

Hereinafter, a technical idea derived from the exemplary embodiment and the modification examples and an operation effect thereof will be described.

(A) A roll holding unit configured to hold a roll including a long medium wound around a core body, a transport mechanism configured to transport the medium supplied from the roll in a transport direction along a transport path, a recording unit configured to perform recording on the transported medium in the transport path, a cutting mechanism configured to cut the medium, on which recording is performed by the recording unit, in an intersecting direction intersecting the transport direction, a discharge unit configured to discharge the medium cut by the cutting mechanism, and a control unit are provided, wherein the transport mechanism includes a transport roller pair disposed upstream of the recording unit in the transport path, and when the control unit, upon performing recording on the medium, cutting the medium to a predetermined length, and discharging the medium, determines that the remaining length of the medium is insufficient to perform recording in a state of pinching the medium by the transport roller pair and the remaining length is greater than the predetermined length, the control unit cuts, by the cutting mechanism, a remaining medium to a predefined length or less and discharges the remaining medium.

According to this configuration, it is possible to suppress jamming of the discharged medium. For example, in a case where the medium loading device is coupled to the discharge unit of the recording device, it is possible to suppress jamming of the medium discharged to the medium loading device. In particular, in a case where the medium loading device includes the restriction surface with which the tip end of the medium discharged from the discharge unit comes into contact in order to align the position of the medium in the discharging direction, it is possible to prevent the medium having the tip end whose position is restricted by the restriction surface and having a length that is greater than the predetermined length from being jammed in the medium loading device.

(B) In the recording device, the predefined length may be a medium length of a recording job having a longest medium length among recording jobs.

According to this configuration, in a case where the recording job includes a plurality of jobs for instructing the lengths of the media individually for a plurality of pieces of recording, when at least two pieces of recording among the plurality of pieces of recording have different lengths of the media, the predefined length is determined in accordance with the job having the longest length. Therefore, for example, it is possible to suppress jamming in the medium loading device.

(C) In the recording device, the predefined length may be a length such that a remaining length after cutting is equal to or greater than a minimum dischargeable length of the medium discharged from the discharge unit.

According to this configuration, a plurality of the media obtained by cutting the remaining length of the medium can be discharged from the discharge unit.

(D) In the recording device, a plurality of the roll holding units may be disposed, and continuous recording may be performed on the medium held by the plurality of roll holding units.

According to this configuration, since it is possible to continuously perform recording on the medium held by the plurality of roll holding units, the productivity of the recording matter is improved.

(E) The recording device may include a rear end detection mechanism configured to detect a rear end of the medium in the transport path, wherein the control unit may be configured to detect a remaining length of the medium based on an output of the rear end detection mechanism.

According to this configuration, when the rear end of the medium is detected by the rear end detection mechanism, the remaining length is known, so the control unit can detect the remaining length of the medium.

(F) In the recording device, the control unit may cause the recording unit to record information indicating that the currently supplied roll is finished at a recordable position in the range of the remaining length of the medium.

According to this configuration, it is possible to know that the currently supplied roll is finished from the content recorded at the recordable position in the range of the remaining length of the medium. It is possible to clarify that the image is not blank due to some error.

(G) A recording system including a recording device and a medium loading device, wherein the recording device includes a roll holding unit configured to hold a roll including a long medium wound around a core body, a transport mechanism configured to transport the medium supplied from the roll in a transport direction along a transport path, a recording unit configured to perform recording on the transported medium in the transport path, a cutting mechanism configured to cut the medium, on which recording is performed by the recording unit, in an intersecting direction intersecting the transport direction, a discharge unit configured to discharge the medium cut by the cutting mechanism, and a control unit, the medium loading device includes a placement unit configured to place the medium discharged from the discharge unit of the recording device, and a restricting unit configured to restrict the medium placed at the placement unit from moving downstream in a discharge direction, the transport mechanism includes a transport roller pair disposed upstream of the recording unit in the transport path, and when the control unit, upon performing recording on the medium, cutting the medium to a predetermined length, and discharging the medium, determines that the remaining length of the medium is insufficient to perform recording in a state of pinching the medium by the transport roller pair and the remaining length is greater than the placeable length at the placement unit, the control unit cuts, by the cutting mechanism, a remaining medium to the placeable length at the placement unit and discharges the remaining medium.

According to this configuration, it is possible to suppress jamming of the discharged medium. For example, in a case where the medium loading device is coupled to the discharge unit of the recording device, it is possible to suppress jamming of the medium discharged to the medium loading device. In particular, in a case where the medium loading device includes a restricting unit that restricts the medium placed at the placement unit from moving downstream in the discharge direction in order to align the position in the discharge direction of the medium discharged from the discharge unit, it is possible to prevent a medium having a length exceeding a predetermined length from causing jamming in the medium loading device because the position of the tip end is restricted by the restricting unit.

(H) In the recording system, when the remaining medium is cut by the cutting mechanism, the control unit may cut the medium to the predetermined length or less.

According to this configuration, it is possible to reliably load the medium discharged from the discharge unit of the recording device at the placement unit of the medium loading device.

(I) In the recording system, when the remaining medium is cut by the cutting mechanism, the control unit may cut the remaining medium to a length greater than the predetermined length.

According to this configuration, the medium at the boundary between the preceding roll and the following roll protrudes like a tab, and thus serves as a mark. Since the mark is provided, for example, it is easy to find the medium from among the loaded group of media.

(J) A control method for a recording device including a roll holding unit configured to hold a roll including a long medium wound around a core body, a transport mechanism configured to transport the medium supplied from the roll in a transport direction along a transport path, a recording unit configured to perform recording on the transported medium in the transport path, a cutting mechanism configured to cut the medium, on which recording is performed by the recording unit, in an intersecting direction intersecting the transport direction, a discharge unit configured to discharge the medium cut by the cutting mechanism, and a control unit, wherein the transport mechanism includes a transport roller pair disposed upstream of the recording unit in the transport path, and the method includes, when determining, upon performing recording on the medium, cutting the medium to a predetermined length, and discharging the medium, that the remaining length of the medium is insufficient to perform recording in a state of pinching the medium by the transport roller pair and the remaining length is greater than the predetermined length, cutting, by the cutting mechanism, the remaining medium to a predefined length and discharging the remaining medium.

According to this method, it is possible to suppress jamming of the discharged medium. For example, in a case where the medium loading device is coupled to the discharge unit of the recording device, it is possible to suppress jamming of the medium discharged to the medium loading device.

What is claimed is:

1. A recording device comprising:

a roll holding unit configured to hold a roll including a long medium wound around a core body;

a transport mechanism configured to transport the medium supplied from the roll in a transport direction along a transport path;

a recording unit configured to perform recording on the transported medium in the transport path;

a cutting mechanism configured to cut the medium, on which recording is performed by the recording unit, in an intersecting direction intersecting the transport direction;

a discharge unit configured to discharge the medium cut by the cutting mechanism; and a control unit, wherein the transport mechanism includes a transport roller pair disposed upstream of the recording unit in the transport path, and when the control unit, upon performing recording on the medium, cutting the medium to a predetermined length, and discharging the medium, determines that the remaining length of the medium is insufficient to perform recording in a state of pinching the medium by the transport roller pair and the remaining length is greater than the predetermined length, the control unit cuts, by the cutting mechanism, a remaining medium to a predefined length or less and discharges the remaining medium.

2. The recording device according to claim 1, wherein the predefined length is a medium length of a recording job having a longest medium length among recording jobs.

3. The recording device according to claim 1, wherein the predefined length is a length such that a remaining length after cutting is equal to or greater than a minimum dischargeable length of the medium discharged from the discharge unit.

4. The recording device according to claim 1, wherein a plurality of the roll holding units are disposed, and the recording device is configured to continuously perform recording on the medium held by the plurality of roll holding units.

5. The recording device according to claim 1, comprising a rear end detection mechanism configured to detect a rear end of the medium in the transport path, wherein the control unit is configured to detect a remaining length of the medium based on an output of the rear end detection mechanism.

6. The recording device according to claim 1, wherein the control unit is configured to record, by the recording unit, information at a recordable position in a range of a remaining length of the medium, the information indicating that a currently supplied roll is finished.

7. A recording system comprising a recording device and a medium loading device, wherein the recording device includes:

a roll holding unit configured to hold a roll including a long medium wound around a core body;

a transport mechanism configured to transport the medium supplied from the roll in a transport direction along a transport path;

a recording unit configured to perform recording on the transported medium in the transport path;

a cutting mechanism configured to cut the medium, on which recording is performed by the recording unit, in an intersecting direction intersecting the transport direction;

a discharge unit configured to discharge the medium cut by the cutting mechanism; and a control unit, the medium loading device includes:

a placement unit configured to place the medium discharged from the discharge unit of the recording device; and a restricting unit configured to restrict the medium placed at the placement unit from moving downstream in a discharge direction, the transport mechanism includes a transport roller pair disposed upstream of the recording unit in the transport path, and when the control unit, upon performing recording on the medium, cutting the medium to a predetermined length, and discharging the medium, determines that the remaining length of the medium is insufficient to perform recording in a state of pinching the medium by the transport roller pair and the remaining length is greater than the placeable length at the placement unit, the control unit cuts, by the cutting mechanism, a remaining medium to the placeable length at the placement unit and discharges the remaining medium.

8. The recording system according to claim 7, wherein when the control unit cuts the remaining medium by the cutting mechanism, the control unit cuts the remaining medium to the predetermined length or less.

9. The recording system according to claim 7, wherein when the control unit cuts the remaining medium by the cutting mechanism, the control unit cuts the remaining medium to a length greater than the predetermined length.

10. A control method for a recording device including:

a roll holding unit configured to hold a roll including a long medium wound around a core body;

a transport mechanism configured to transport the medium supplied from the roll in a transport direction along a transport path;

a recording unit configured to perform recording on the transported medium in the transport path;

a cutting mechanism configured to cut the medium, on which recording is performed by the recording unit, in an intersecting direction intersecting the transport direction; and a discharge unit configured to discharge the medium cut by the cutting mechanism, wherein the transport mechanism includes a transport roller pair disposed upstream of the recording unit in the transport path, and the method includes, when determining, upon performing recording on the medium, cutting the medium to a predetermined length, and discharging the medium, that the remaining length of the medium is insufficient to perform recording in a state of pinching the medium by the transport roller pair and the remaining length is greater than the predetermined length, cutting, by the cutting mechanism, the remaining medium to a predefined length and discharging the remaining medium.

* * * * *